(12) United States Patent
Yamamoto

(10) Patent No.: US 12,101,736 B2
(45) Date of Patent: Sep. 24, 2024

(54) POSITION ESTIMATION SYSTEM AND POSITION ESTIMATION METHOD

(71) Applicant: Hitachi, Ltd., Tokyo (JP)

(72) Inventor: Masaaki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 17/577,525

(22) Filed: Jan. 18, 2022

(65) Prior Publication Data

US 2022/0312365 A1  Sep. 29, 2022

(30) Foreign Application Priority Data

Mar. 26, 2021 (JP) ................................. 2021-053623

(51) Int. Cl.
*H04W 64/00* (2009.01)
*G06F 18/214* (2023.01)
*H04W 84/18* (2009.01)

(52) U.S. Cl.
CPC ...... *H04W 64/006* (2013.01); *G06F 18/2148* (2023.01); *H04W 84/18* (2013.01)

(58) Field of Classification Search
CPC ..................... H04W 64/006; H04W 64/0006
See application file for complete search history.

(56) References Cited

U.S. PATENT DOCUMENTS

| 2014/0335894 | A1* | 11/2014 | Wirola | H04W 4/029 |
| | | | | 455/456.1 |
| 2016/0063459 | A1* | 3/2016 | Li | H04W 4/44 |
| | | | | 705/39 |
| 2017/0052538 | A1* | 2/2017 | Li | H04W 4/48 |
| 2018/0041873 | A1* | 2/2018 | Hirade | H04W 4/027 |
| 2021/0095967 | A1* | 4/2021 | Karon | H04W 4/021 |
| 2022/0182785 | A1* | 6/2022 | Edge | G01S 19/01 |

FOREIGN PATENT DOCUMENTS

JP  2016-170012 A  9/2016

* cited by examiner

*Primary Examiner* — Barry W Taylor
(74) *Attorney, Agent, or Firm* — Volpe Koenig

(57) ABSTRACT

A position estimation system includes: a processor; and a storage device. The storage device stores data associating measurement data obtained by a terminal device with a position identifier. The measurement data includes on a measured radio wave data, and data a measured acceleration. The processor specifies a period from when the terminal device acquires the position identifier until the processor determines that a user of the terminal device has moved; uses training data including the measurement data obtained by the terminal device during the specified period and the position identifier corresponding to the measurement data obtained by the terminal device to create a position estimation model that outputs the position identifier as a position estimation result when the position estimation model receives the measurement data; and when the processor receives the measurement data, estimates a position of the terminal device by using the measurement data and the position estimation model.

20 Claims, 18 Drawing Sheets

FIG. 10

SEAT CORRECTION TABLE OF
SMARTPHONE A

| PRE-CORRECTION SEAT IDENTIFIER | POST-CORRECTION SEAT IDENTIFIER |
|---|---|
| 1 | 1 |
| 2 | 1 |

FIG. 17

| SEAT IDENTIFIER | AREA IDENTIFIER |
|---|---|
| 1 | a |
| 2 | a |
| 3 | a |
| 4 | a |
| 5 | a |
| 6 | a |
| 7 | a |
| 8 | a |
| 9 | a |
| 10 | a |
| 11 | a |
| 12 | a |
| 13 | b |
| 14 | b |
| 15 | b |
| 16 | b |
| 17 | b |
| 18 | b |
| 19 | b |
| 20 | b |
| 21 | b |
| 22 | b |
| 23 | b |
| 24 | b |

POSITION ESTIMATION SYSTEM AND POSITION ESTIMATION METHOD

CLAIM OF PRIORITY

The present application claims priority from Japanese patent application JP 2021-053623, filed on Mar. 26, 2021, the content of which is hereby incorporated by reference into this application.

BACKGROUND OF THE INVENTION

1. Field of the Invention

The present invention relates to a position estimation technique.

2. Description of the Related Art

As a technique for estimating a position of an indoor terminal, for example, there is a technique described in JP-A-2016-170012 (Patent Literature 1). Patent Literature 1 describes "a positioning device that measures a position of an indoor terminal, the positioning device including: a receiving unit configured to receive, from the terminal, sensor information including at least one of radio wave intensities or sound wave intensities measured by the terminal in a predetermined time in time series, and positional information of the terminal; and a model generation unit configured to generate a learning model with the sensor information and the position information as training data."

Patent Literature 1 describes that a position estimation model is generated by using training data for each terminal. It is expected that a position of a terminal can be estimated with high accuracy by using a position estimation model corresponding to the terminal. In order to learn such a position estimation model for each terminal, it is desirable to acquire the training data under a circumstance where each terminal is used by a user. However, when the user is actually using the terminal, the data acquired from the terminal usually includes data that cannot be used as the training data. Therefore, an accuracy of the learned position estimation model will decrease unless appropriate training data is extracted from such data.

SUMMARY OF THE INVENTION

In order to solve at least one of the above problems, the invention relates to a position estimation system including: a processor; and a storage device. The storage device is configured to store data associating measurement data obtained by a first terminal device with a position identifier. The measurement data includes data on at least one of a radio wave, a geomagnetism, a direction or an atmospheric pressure which are measured. The measurement data further includes data on at least one of a measured acceleration or the number of steps calculated based on the acceleration. The processor is configured to: specify a period from when the first terminal device acquires the position identifier until when the processor determines that a user of the first terminal device has moved based on the acceleration or the number of steps; use first training data including the measurement data obtained by the first terminal device during the specified period and the position identifier corresponding to the measurement data obtained by the first terminal device to create a position estimation model configured to output the position identifier as a position estimation result when the position estimation model receives the measurement data; and when the processor receives the measurement data obtained by the first terminal device, estimate a position of the first terminal device by using the received measurement data and the position estimation model.

According to one aspect of the invention, highly-accurate position estimation becomes possible by acquiring appropriate training data from a terminal used by a user and learning a position estimation model. Objects, configurations, and effects other than those described above will be clarified by following embodiments.

BRIEF DESCRIPTION OF THE DRAWINGS

FIG. 10 is an explanatory diagram illustrating an example of a seat correction table in the position estimation system according to the second embodiment of the invention.

FIG. 17 is an explanatory diagram illustrating an example of an area correspondence table stored in the position estimation system according to the fourth embodiment of the invention.

DESCRIPTION OF THE PREFERRED EMBODIMENTS

Hereinafter, embodiments of the invention will be described with reference to the drawings.

First Embodiment

Figure 1:
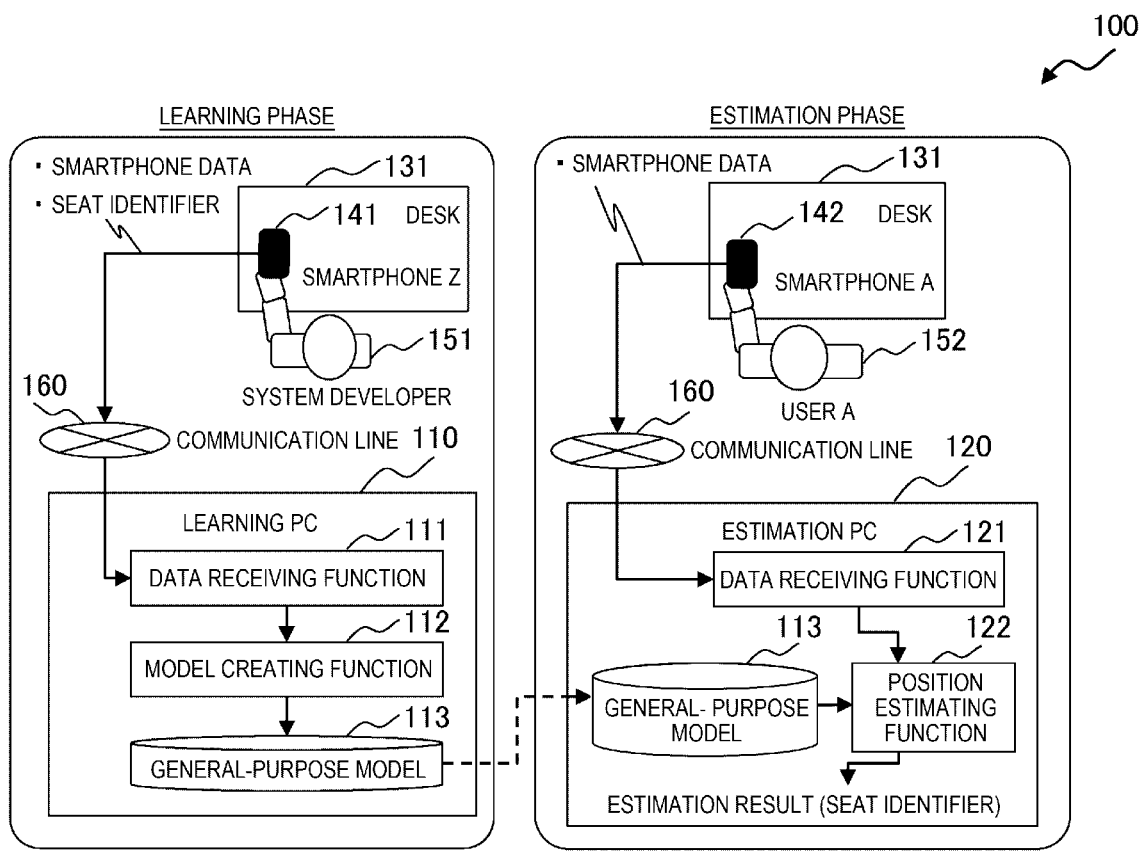
FIG. 1 is an explanatory diagram illustrating an example of learning of a general-purpose model and an example of position estimation using the general-purpose model by a position estimation system according to a first embodiment of the invention.

FIG. 1 is an explanatory diagram illustrating an example of learning of a general-purpose model and an example of position estimation using the general-purpose model by a position estimation system according to the first embodiment of the invention.

Here, a position estimation system 100 that estimates a seat in which a user carrying a terminal device such as a smartphone is present based on data measured by the smartphone in an indoor space such as an office will be described as an example. The position estimation according to the present embodiment includes a learning phase of learning a position estimation model and an estimation phase of performing a position estimation by using the position estimation model acquired by learning.

In the learning phase, a system developer 151 sequentially places a smartphone 141 on desks of all seats (FIG. 1 shows a desk 131 as one of the desks). The smartphone 141 measures an intensity of a received radio wave, a direction, a geomagnetism, an atmospheric pressure and the like while being placed on each desk. Further, the smartphone 141 acquires a seat identifier of the desk 131 on which the smartphone 141 is placed. The smartphone 141 transmits these measurement data and seat identifiers of the desks on which the smartphone 141 is placed at the time of measurement to a learning personal computer (PC) 110 via a communication line 160 together with an identifier of the smartphone. In the present embodiment, data including at least the measurement data transmitted from the smartphone is also referred to as smartphone data. In the learning phase, the seat identifiers are also transmitted in addition to the smartphone data.

Placing the smartphone 141 on the desks to acquire the measurement data is an example of a method for acquiring the measurement data. The measurement data may also be acquired by adopting a method other than the above, such as the system developer 151 sitting in each seat while carrying the smartphone 141 and acquiring the measurement data at that time. A method for acquiring the seat identifiers may also be any method, such as the system developer 151 operating a screen of the smartphone 141 and manually inputting the seat identifiers, a method of the smartphone reading information on wireless tags provided on desks by near field communication (NFC), or a camera of the smartphone 141 reading barcodes or the like displayed on the desks. The seat identifiers acquired in this way correspond to a correct answer of the seat identifiers estimated based on the smartphone data, and the smartphone data and corresponding seat identifiers are used as training data for the learning of the position estimation model.

A data receiving function 111 of a learning PC 110 receives the smartphone data and the seat identifiers via the communication line 160. A model creating function 112 of the learning PC 110 uses the received measurement data and seat identifiers as the training data to create a position estimation model for estimating the seat identifier from the measurement data. The position estimation model created thereby is referred to as a general-purpose model 113 in the present embodiment. The general-purpose model 113 is, for example, a machine learning model, and may be applied with any algorithm such as a support vector machine (SVM) or a gradient boosted decision tree (GBDT).

The general-purpose model 113 is generated by the learning PC 110 and then is stored in an estimation PC 120. In the estimation phase, when a user 152 carrying a smartphone 142 sits in one of the seats, an intensity of a radio wave received by the smartphone 142 and the like is measured, and smartphone data including the measurement data and the identifier of the smartphone are transmitted to the estimation PC.

A data receiving function 121 of the estimation PC receives the smartphone data via the communication line 160. A position estimating function 122 of the estimation PC uses the general-purpose model 113 to estimate the seat identifier based on the measurement data, and outputs the acquired seat identifier as an estimation result. The estimation PC 120 can store information associating the identifier of the smartphone 142 with the user 152, and can estimate a placement relation between smartphones and the seats (that is, in which seat each of users carrying different smartphones is seated) with reference to this information.

Figure 2:
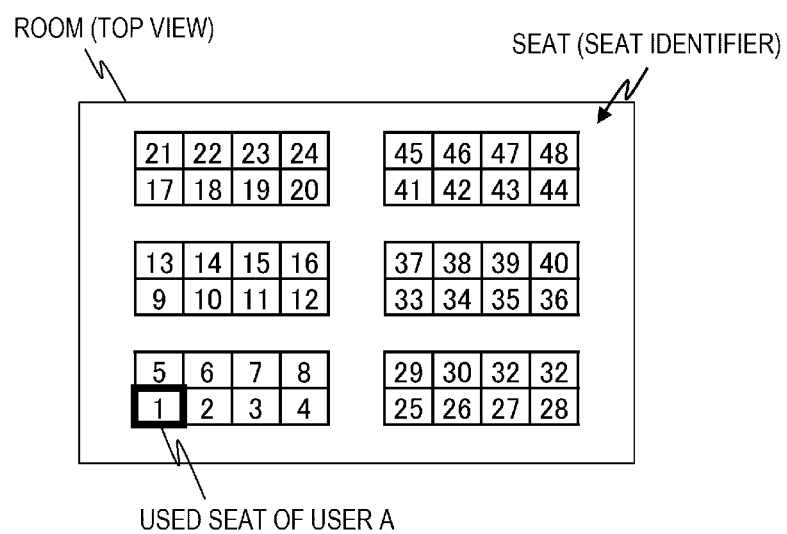
FIG. 2 is an explanatory diagram illustrating an example of arrangement of seats as subjects of estimation by the position estimation system according to the first embodiment of the invention.

FIG. 2 is an explanatory diagram illustrating an example of arrangement of seats as subjects of estimation by the position estimation system 100 according to the first embodiment of the invention.

In the first embodiment, a space as a subject of estimation by the position estimation system 100 is, for example, a room such as an office, and plural seats are arranged therein. Each seat includes a desk and a chair for the user to work and is identified by an identifier of from 1 to 48. For example, when a user A (for example, the user 152 shown in FIG. 1) uses a seat having an identifier "1" at a certain moment, this seat becomes a used seat of the user A (that is, the seat in which the user A stays). The position estimation system 100 estimates the used seat based on data acquired by a smartphone carried by the user A (for example, the smartphone 142 shown in FIG. 1).

Figure 3:
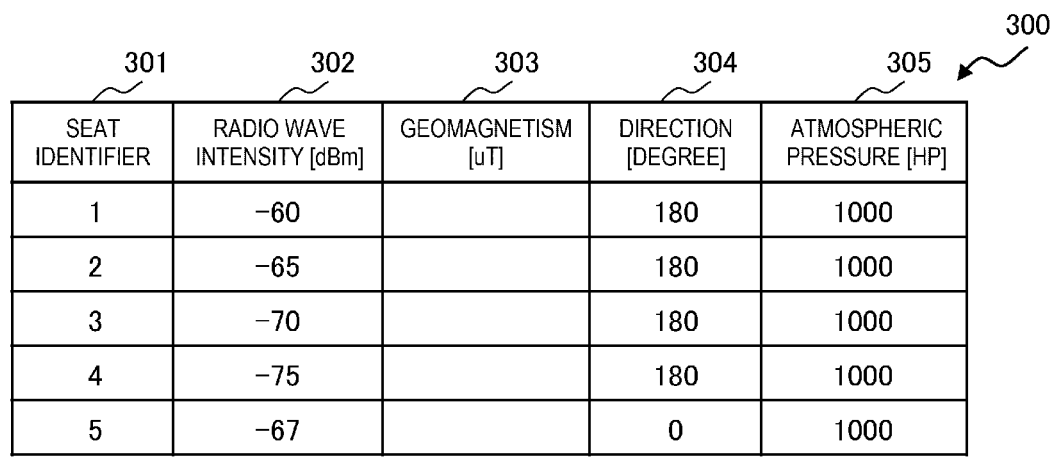
FIG. 3 is an explanatory diagram illustrating an example of training data in the position estimation system according to the first embodiment of the invention.

FIG. 3 is an explanatory diagram illustrating an example of training data in the position estimation system 100 according to the first embodiment of the invention.

Training data 300 shown in FIG. 3 includes the smartphone data and the seat identifiers transmitted from the smartphone 141 used by the system developer 151, and is stored in the learning PC 110. The training data 300 includes a seat identifier 301, a radio wave intensity 302, a geomagnetism 303, a direction 304 and an atmospheric pressure 305. The radio wave intensity 302, the geomagnetism 303, the direction 304 and the atmospheric pressure 305 correspond to the smartphone data transmitted from the smartphone 141, and the seat identifier 301 corresponds to the seat identifiers transmitted corresponding to the smartphone data.

The seat identifier 301 is information identifying each seat, for example, one of values 1 to 48 shown in FIG. 2. The radio wave intensity 302 includes the intensities of the radio waves received by the smartphone, which are measured at each seat. The radio waves received here are transmitted from a radio base station appropriately provided in the room or outside the room. In FIG. 3, only one value of the radio wave intensity 302 is recorded corresponding to one value of the seat identifier 301 in order to simplify the explanation, but actually, plural values indicating the intensities of the radio waves received from plural radio base stations may be recorded. The radio base station may be, for example, a WiFi access point, a Bluetooth (registered trademark) beacon, or others. In addition, plural types of radio base stations may exist in combination.

The geomagnetism 303 indicates a strength of the geomagnetism measured by the smartphone. The direction 304 indicates a posture in which the smartphone is placed, for example, to which direction the smartphone is directed. A value of the direction 304 is calculated based on, for example, an orientation of the geomagnetism 303. The atmospheric pressure 305 indicates an atmospheric pressure measured by the smartphone.

The training data 300 shown in FIG. 3 is an example. Actually, the training data 300 may include more information, and may not include a part of the shown data.

Figure 4:
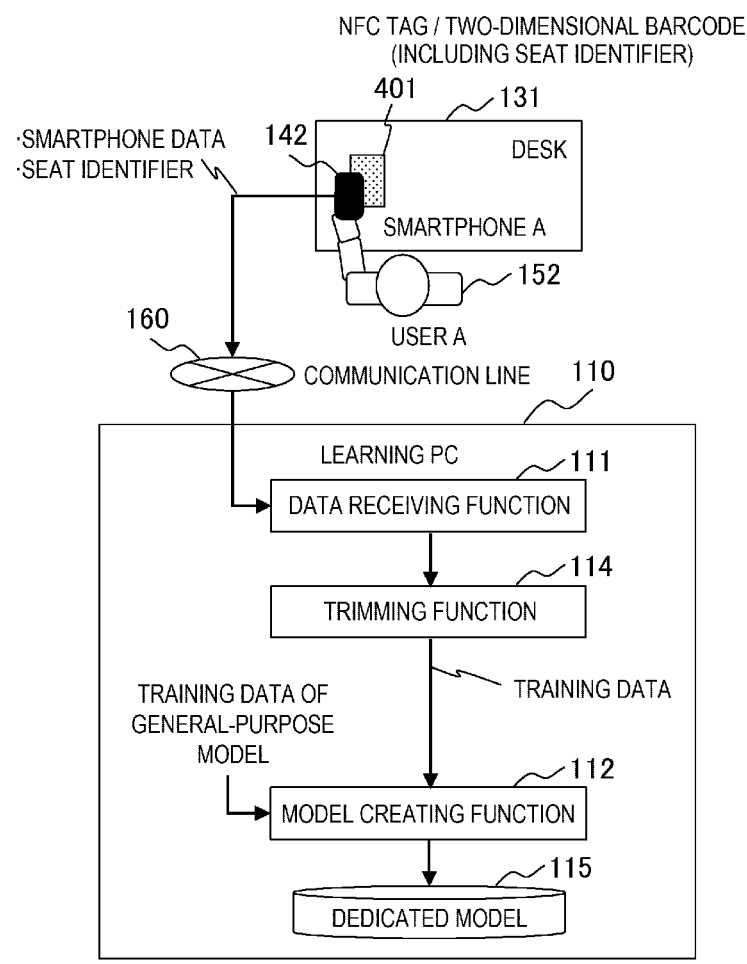
FIG. 4 is an explanatory diagram illustrating an example of learning of a dedicated model by the position estimation system according to the first embodiment of the invention.

FIG. 4 is an explanatory diagram illustrating an example of learning of a dedicated model by the position estimation system 100 according to the first embodiment of the invention.

When the general-purpose model 113 generated as shown in FIG. 1 is used to perform a position estimation based on the data acquired from the smartphone 142 of the user 152, a position estimation error may occur due to a difference in measurement conditions between the learning phase and the estimation phase. For example, a difference may occur in measured values due to a difference between a model of the smartphone 141 used in the learning phase and a model of the smartphone 142 used in the estimation phase. In addition, even if the models are the same, a difference may occur in the measured values due to individual differences. Alternatively, a difference may occur in the measured values due to a difference in the states of the smartphone at the time of measurement (for example, the smartphone is placed on the desk in the learning phase, but is in a pocket of the user in the estimation phase).

Therefore, in the present embodiment, in the learning phase, a position estimation model dedicated to the smartphone 142 (in other words, dedicated to the user 152 who uses the smartphone 142) is created with the data measured by the smartphone 142 used by the user 152 as the training data. In the present embodiment, such a position estimation model is also referred to as a dedicated model. Further, in the estimation phase, the position of the user 152 is estimated using the dedicated model. As a result, it is expected that the measurement conditions of the estimation phase and the learning phase are approximated to each other, and the position estimation error is reduced.

Hereinafter, learning of the dedicated model will be described with reference to FIG. 4. The learning of the dedicated model is executed after the learning PC acquires the training data for learning the general-purpose model by the procedure shown in FIG. 1, for example.

In a seat having a high use frequency by the user 152, the user 152 inputs the identifier of the seat into the smartphone carried by the user 152. Here, an example of inputting the seat identifier by causing the smartphone 142 to read the information of the wireless tag or barcode 401 provided on the desk is shown, whereas other methods may also be adopted. Examples of a timing to read the seat identifier include a timing when the user 152 checks in for work, a timing when it is determined that the position estimation result of the seat is incorrect, and a timing when a notification on a read request is received from the position estimation system or the like. The notification on the read request may be transmitted, for example, when a distance between the seat specified as the position estimation result and a seat having a use record by the user 152 exceeds a predetermined threshold value.

Then, the smartphone 142 measures the radio wave intensity, the direction, the geomagnetism, the atmospheric pressure and the like, and transmits the smartphone data including these measured values and the identifier of the smartphone 142 to the learning PC 110 together with the read seat identifier. In this case, the smartphone 142 may measure the radio wave intensity and the like for each time and include the time together with the measured values in the smartphone data. In addition, the smartphone 142 may transmit the smartphone data while including in the smartphone data acceleration data for each time measured by an acceleration sensor built in the smartphone 142, step count data calculated based on the acceleration data, and the like.

The data receiving function 111 of the learning PC receives the smartphone data via the communication line 160. The smartphone data and the seat identifier acquired from the smartphone 142 are stored in the learning PC 110. When time information and the acceleration data for each time are transmitted from the smartphone 142, the time information and the acceleration data are also stored in the learning PC 110. A trimming function 114 of the learning PC 110 extracts the smartphone data to be used as the training data of the learning by trimming the smartphone data. Details of the trimming will be described later (see FIG. 5).

The model creating function 112 uses the smartphone data acquired for creating the general-purpose model 113 and the smartphone data acquired from the smartphone 142 of the user 152 to create a position estimation model dedicated to the user 152 (that is, a dedicated model 115).

For example, the dedicated model 115 may be generated by using, as the training data, data obtained by adding the smartphone data acquired from the smartphone 142 of the user 152 to the smartphone data for creating the general-purpose model which is acquired by the procedure shown in FIG. 1. Alternatively, data acquired by replacing the data corresponding to the seat whose data is acquired by the smartphone 142 of the user 152 with the smartphone data acquired from the smartphone 142 of the user 152 among the smartphone data for creating the general-purpose model may be used as the training data.

For example, the training data 300 shown in FIG. 3 is training data for creating the general-purpose model 113. When the smartphone data corresponding to the seat identifier "1" is acquired from the smartphone 142 of the user 152, the values of the radio wave intensity 302 and the like corresponding to the value "1" of the seat identifier 301 may be deleted from the training data 300, and the values included in the smartphone data acquired from the smartphone 142 may be stored in the radio wave intensity 302 and the like instead. Alternatively, a new record may be added to the training data 300 without performing the above deletion, so that "1" is stored in the seat identifier 301 of the record, and the values included in the smartphone data acquired from the smartphone 142 are stored in the radio wave intensity 302 and the like.

Similar to the case of the general-purpose model 113, any machine learning algorithm can be applied to generate the dedicated model 115. The generated dedicated model 115 is stored in the estimation PC 120, and is used for the position estimation.

In the estimation phase, the estimation PC 120 uses the dedicated model 115 of the user 152 instead of the general-purpose model 113 to estimate the position of the user 152. A procedure for a processing by the estimation phase is similar to that shown in FIG. 1 except that the dedicated model 115 of the user 152 is used instead of the general-purpose model 113.

Figure 5:
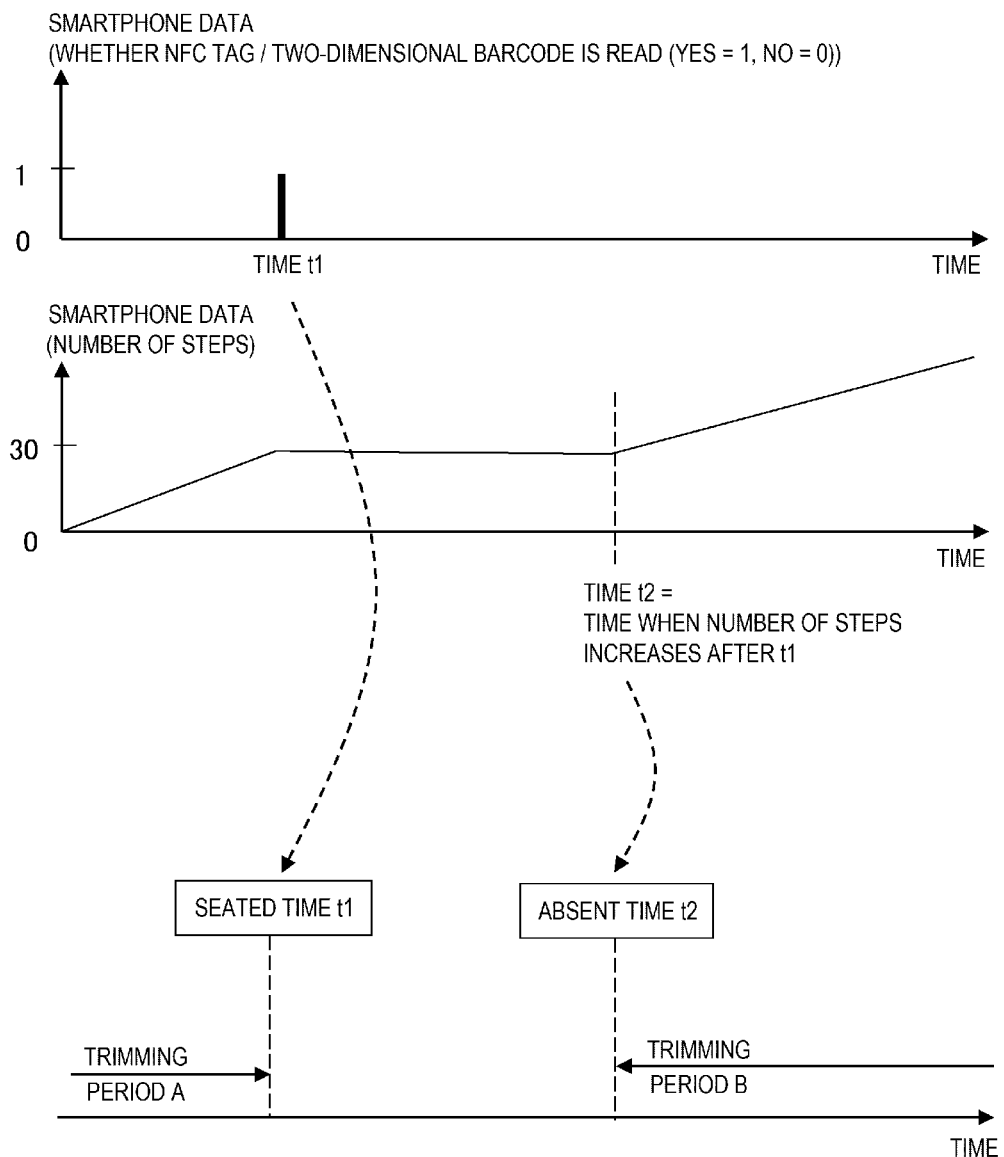
FIG. 5 is an explanatory diagram illustrating an example of trimming of smartphone data by the position estimation system according to the first embodiment of the invention.

FIG. 5 is an explanatory diagram illustrating an example of the trimming of the smartphone data by the position estimation system 100 according to the first embodiment of the invention.

Upon the creation of the general-purpose model 113 shown in FIG. 1, since the system developer 151 carries the smartphone for a purpose of measuring data, it is unlikely that the training data includes data not suitable for the training data, such as data measured while the system developer is moving between the seats. On the other hand, upon the creation of the dedicated model 115, since the data is measured during the daily use of the smartphone 142 by the user 152, data not suitable as the training data may be acquired, such as the radio wave intensity and the like at a place other than the seats when the user 152 leaves the seats while carrying the smartphone 142. The trimming function 114 automatically removes such data not suitable as the training data.

For example, the trimming function 114 may perform the trimming based on the number of steps included in the smartphone data stored in the learning PC 110. Specifically, the trimming function 114 acquires a time t1 when the smartphone 142 reads the seat identifier as a time when the user 152 is estimated to be seated. Further, the trimming function 114 refers to the number of steps included in the smartphone data, and acquires a time t2 when the number of steps increases by no less than a predetermined reference value after the time t1 as a time when the user 152 is estimated to have left the seat. Further, the trimming function 114 trims the smartphone data in a period prior to the time t1 and in a period after the time t2, and acquires the smartphone data in a period from the time t1 to the time t2 as the training data.

Alternatively, the trimming function 114 may refer to the acceleration data instead of the number of steps, and estimate the time t2 when the acceleration data satisfies a predetermined condition after the time t1 as a time when the user leaves the seat. The predetermined condition is a condition on the acceleration that the user is estimated to leave the seat and move. In this way, by estimating the period during which the user 152 is seated based on the reading of the seat identifier and the acceleration or the number of steps calculated based on the acceleration, and using the smartphone data during this period as the training data, it is possible to create a highly-accurate position estimation model.

Figure 6:
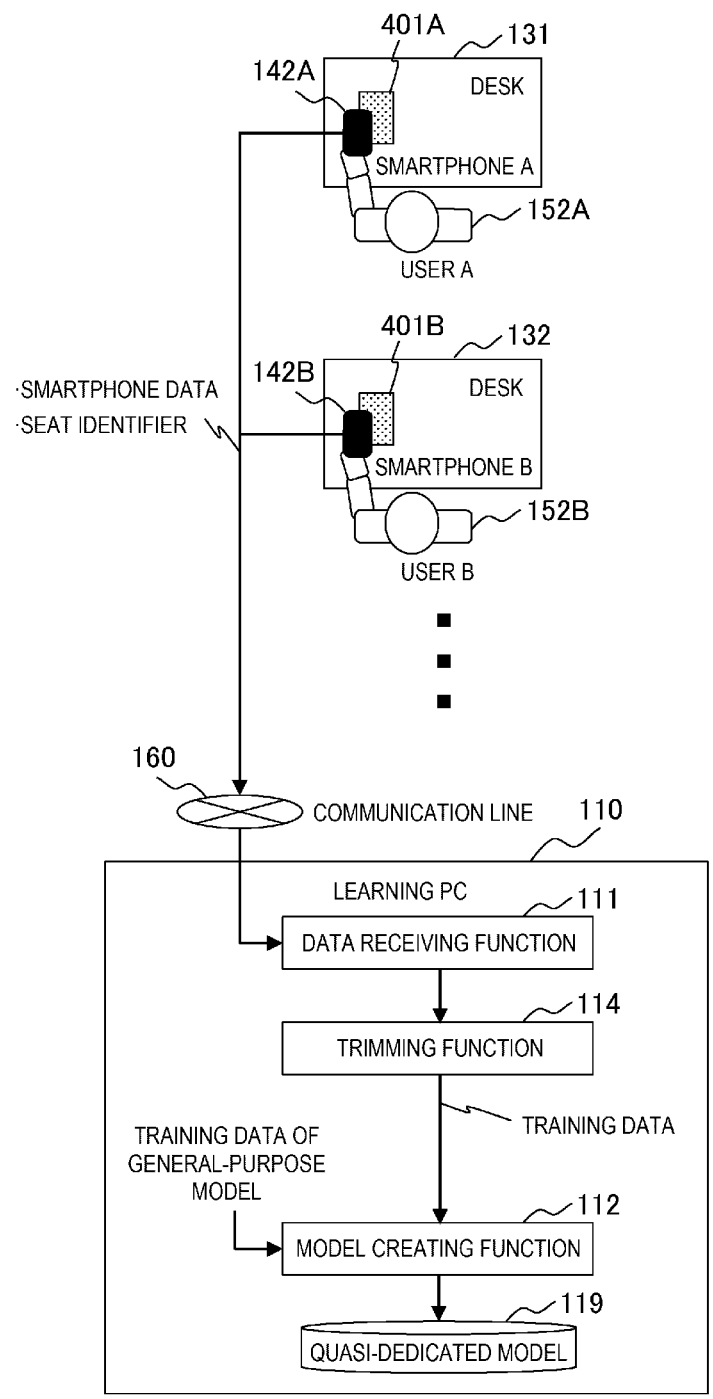
FIG. 6 is an explanatory diagram illustrating an example of learning of a quasi-dedicated model by the position estimation system according to the first embodiment of the invention.

FIG. 6 is an explanatory diagram illustrating an example of learning of a quasi-dedicated model by the position estimation system 100 according to the first embodiment of the invention.

Since the dedicated model 115 shown in FIG. 4 is created based on the data measured by using the smartphone 142 actually used by the user 152, it is considered that the accuracy of the position estimation of the user 152 is improved. However, since this dedicated model 115 is created for each user, when many users are present, the amount of data of the dedicated models for all users to be read by the estimation PC 120 becomes particularly enormous, which increases a reading time or the like and thus makes quick estimation difficult. Therefore, the learning PC 110 may create a quasi-dedicated model 119 as shown in FIG. 6 instead of the dedicated model 115.

According to the example of FIG. 6, each of the smartphones 142 carried by the users 152 measures the data by the same procedure as that shown in FIG. 4, and transmits the smartphone data including the measured data to the learning PC 110. In the following explanation, when it is necessary to explain each of the users 152 in a discriminate manner, the users may be referred to as a user A 152A, a user B 152B, and so on. The same applies to the smartphone 142, the dedicated model 115, and the wireless tag or barcode 401 or the like.

FIG. 6 shows an example that a smartphone A 142A carried by the user A 152A and a smartphone B 142B carried by the user B 152B read the wireless tag or barcode 401A and the wireless tag or barcode 401B, respectively, and further measure the radio wave intensity and the like and transmit results thereof to the learning PC 110. Actually, the smartphone 142 of another user 152 may perform the same processing.

The trimming function 114 trims the smartphone data for each smartphone 142 as a transmission source and extracts the training data. Then, the model creating function 112 uses the training data extracted from plural pieces of smartphone data and the training data for the general-purpose model 113 to create the quasi-dedicated model 119.

As an example, a case where the smartphone data acquired when the user A 152A is seated in a seat 1 (for example, corresponding to the desk 131 in FIG. 6) and the smartphone data acquired when the user B 152B is seated in a seat 2 (for example, corresponding to a desk 132 in FIG. 6) are used will be described. In such a case, the training data is acquired by replacing the data corresponding to the seat 1 of the training data for the general-purpose model 113 with the smartphone data acquired when the user A 152A is seated in the seat 1, and replacing the data corresponding to the seat 2 of the training data for the general-purpose model 113 with the smartphone data acquired when the user B 152B is seated in the seat 2. The model creating function uses this training data to create the quasi-dedicated model.

One quasi-dedicated model 119 created in this way is used for the position estimation of the user A 152A and the position estimation of the user B 152B. The same applies to a case where the data is acquired from the smartphones 142 of three or more users 152. Therefore, one quasi-dedicated model 119 is created based on the training data including the smartphone data acquired from the smartphones 142 of the users 152. Since this quasi-dedicated model 119 can be used for plural users 152, the amount of data of the position estimation model to be read by the estimation PC 120 is reduced, which reduces a cost due to a memory capacity to be secured in the estimation PC 120, shortens the time required for the reading, and thereby enables quick position estimation.

Figure 7:
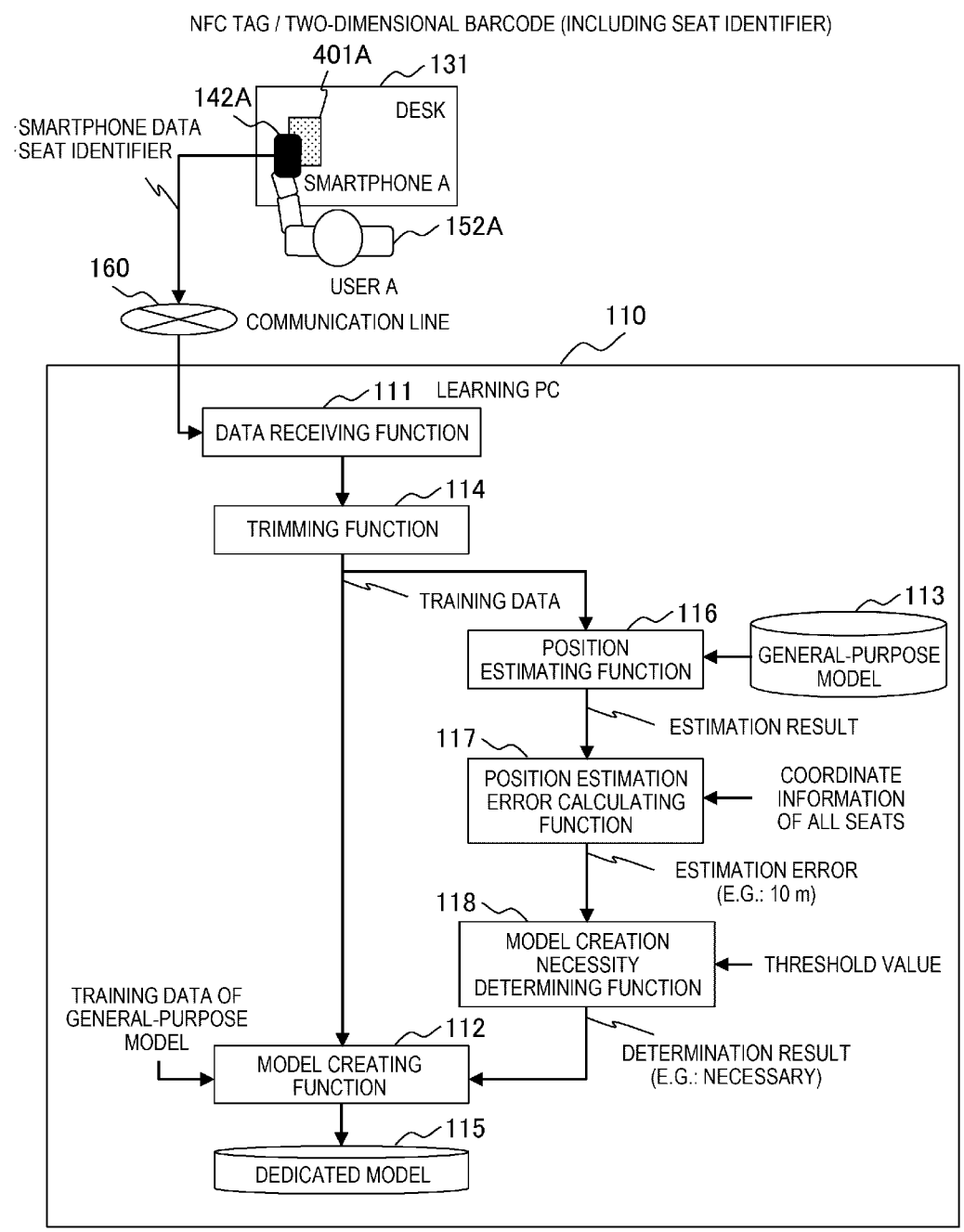
FIG. 7 is an explanatory diagram illustrating an example of necessity determination of creating the dedicated model by the position estimation system according to the first embodiment of the invention.

FIG. 7 is an explanatory diagram illustrating an example of necessity determination of creating the dedicated model 115 by the position estimation system 100 according to the first embodiment of the invention.

For example, the creation of the dedicated model 115 described with reference to FIG. 4 may be executed when a predetermined condition is satisfied, such as when the accuracy of the position estimation by the general-purpose model 113 is lower than a predetermined criteria. FIG. 7 shows an example of the creation of the dedicated model 115 under such a predetermined condition.

A processing of the smartphone 142 transmitting the smartphone data to the learning PC 110 and the data receiving function 111 of the learning PC 110 receiving the smartphone data is the same as that described with reference to FIG. 4.

The learning PC 110 shown in FIG. 7 further includes a position estimating function 116, a position estimation error calculating function 117 and a model creation necessity determining function 118. The position estimating function 116 may be the same as the position estimating function 122 of the estimation PC 120. The position estimating function 116 refers to the trimmed smartphone data and performs the position estimation using the general-purpose model 113. The position estimation error calculating function 117 compares the estimated position with coordinate information of the seat corresponding to the seat identifier included in the smartphone data (that is, the correct seat), and calculates an estimation error. The model creation necessity determining function 118 determines that it is necessary to create the dedicated model when the estimation error exceeds a predetermined threshold value, and transmits this determination result to the model creating function 112. The model creating function 112 creates the dedicated model 115 by the method shown in FIG. 4 in accordance with the determination result.

Therefore, when a position estimation result having sufficiently high accuracy can be acquired even with the general-purpose model 113, it is not necessary to create the dedicated model 115.

When the model creation necessity determining function 118 determines that it is necessary to create the model, the model creating function 112 may generate the quasi-dedicated model 119 by the method shown in FIG. 6 instead of generating the dedicated model 115.

Further, the processing shown in FIG. 7 may be executed when the dedicated model 115 or the quasi-dedicated model 119 has already been generated and used. For example, the accuracy of the position estimation by the position estimation model that has already been created may decrease when a radio wave propagation status changes due to a layout change of the room or the like after the dedicated model 115 or the quasi-dedicated model 119 is generated, etc. In such a case, the processing shown in FIG. 7 may be executed.

Specifically, the position estimating function 116 may execute the position estimation using the dedicated model 115 or the quasi-dedicated model 119 instead of the general-purpose model 113. Subsequent processings by the position estimation error calculating function 117 and the model creation necessity determining function 118 are the same as described above. Accordingly, the accuracy of the position estimation model can be maintained.

The position estimating function 122 of the estimation PC 120 may execute position estimation for estimation error calculation instead of the position estimating function 116 of the learning PC 110. For example, the learning PC 110 transmits at least the data such as the radio wave intensity to be used for the position estimation of the training data output from the trimming function 114 to the estimation PC 120. The position estimating function 122 of the estimation PC 120 may execute the position estimation based on the data and respond to the learning PC 110 with the seat identifier as the estimation result. In that case, the position estimation error calculating function 117 of the learning PC 110 calculates the estimation error with reference to the estimation result acquired from the estimation PC 120 and the training data. Therefore, it becomes unnecessary for the learning PC to store the position estimating function 116 and the general-purpose model 113.

Figure 8:
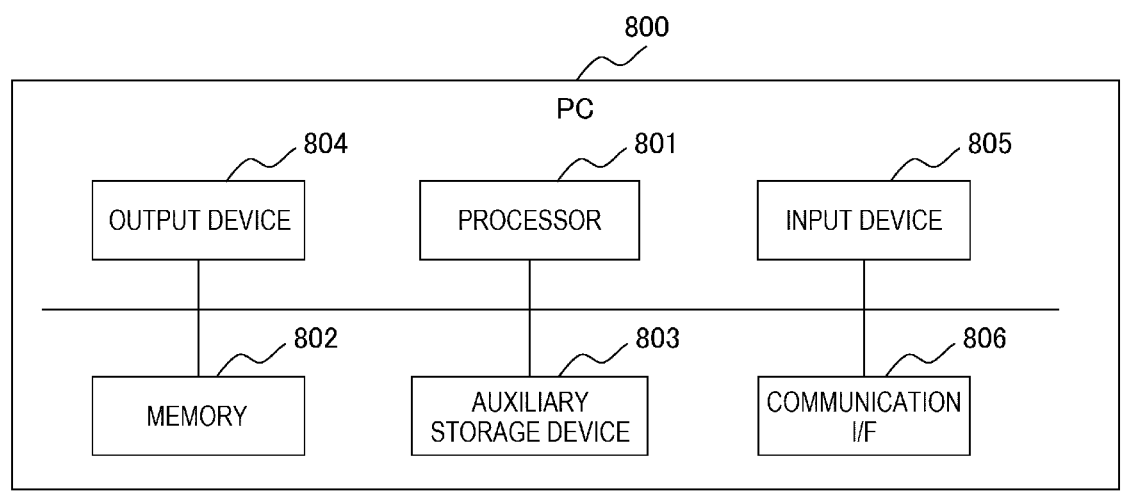
FIG. 8 is a block diagram illustrating an example of a hardware configuration of the position estimation system according to the first embodiment of the invention.

FIG. 8 is a block diagram illustrating an example of a hardware configuration of the position estimation system 100 according to the first embodiment of the invention.

The learning PC 110 and the estimation PC 120 shown in FIGS. 1, 4, 6 and 7 may be each configured as a PC 800 shown in FIG. 8.

The PC 800 is a computer including a processor 801, a memory (main storage device) 802, an auxiliary storage device 803, an output device 804, an input device 805, and a communication interface (I/F) 806. These components are connected to each other by a bus. The memory 802, the auxiliary storage device 803 or a combination thereof is a storage device and stores programs and data to be used by the processor 801.

The memory 802 is configured with, for example, a semiconductor memory, and is mainly used for storing programs being executed and data. The processor 801 executes various processings according to the programs stored in the memory 802. The processor 801 operates according to the programs, thereby implementing various functions.

For example, the processor 801 operates according to the corresponding programs, thereby implementing the data receiving function 111, the model creating function 112, the trimming function 114, the position estimating function 116, the position estimation error calculating function 117, the model creation necessity determining function 118, the data receiving function 121 and the position estimating function 122.

The auxiliary storage device 803 is configured with a large-capacity storage device such as a hard disk drive or a solid state drive, and is used to store the programs and the data for a long period of time. For example, the training data 300, the general-purpose model 113, the dedicated model 115, the quasi-dedicated model 119 and the like may be stored in the auxiliary storage device 803. The programs and the data stored in the auxiliary storage device 803 may be at least partially loaded into the memory 802 as needed.

The processor 801 can be configured with a single processing unit or plural processing units, and can include a single or plural arithmetic units, or plural processing cores. The processor 801 can be implemented as one or plural central processing units, a microprocessor, a microcomputer, a microcontroller, a digital signal processor, a state machine, a logic circuit, a graphics processing device, a chip-on system, and/or any device that operates a signal based on a control instruction.

The programs and the data stored in the auxiliary storage device 803 are loaded into the memory 802 at start-up or when needed, and the processor 801 executes the programs, thereby executing various processings of the position estimation system 100. Therefore, in the following, the processings executed by the position estimation system 100 are processings executed by the processor 801 or by the programs.

The input device 805 is a hardware device by which an administrator of the position estimation system 100 inputs an instruction, information and the like to the position estimation system 100. The output device 804 is a hardware device that presents various images for input and output, and is, for example, a display device or a printing device. The communication I/F 806 is an interface for connecting to the communication line 160.

The functions of the position estimation system 100 can be implemented in a computer system including one or more computers each including one or more processors and one or more storage devices each including a non-transitory storage medium. Plural computers communicate via a network. For example, some of the functions of the position estimation system 100 may be implemented in one computer, and the other functions may be implemented in the other computers. For example, the learning PC 110 and the estimation PC 120 may be implemented in different PC 800s as shown in FIG. 1, or may be implemented in the same PC 800.

Second Embodiment

Next, the second embodiment of the invention will be described. Since each unit of a system of the second embodiment has the same functions as those of each unit denoted by the same reference numerals of the first embodiment shown in FIGS. 1 to 8 except for differences to be described below, the description thereof will be omitted.

When the seat is to be estimated based on the measurement data such as the radio wave intensity, the measurement data may be similar for plural seats, and thus the estimation result may be incorrect. However, in actual seat usage of users, it is assumed that the seats used by the users are often limited to a small number of specific seats. A position estimation system of the second embodiment corrects the estimation result based on the measurement data with reference to a past seat use record by the users.

Figure 9:
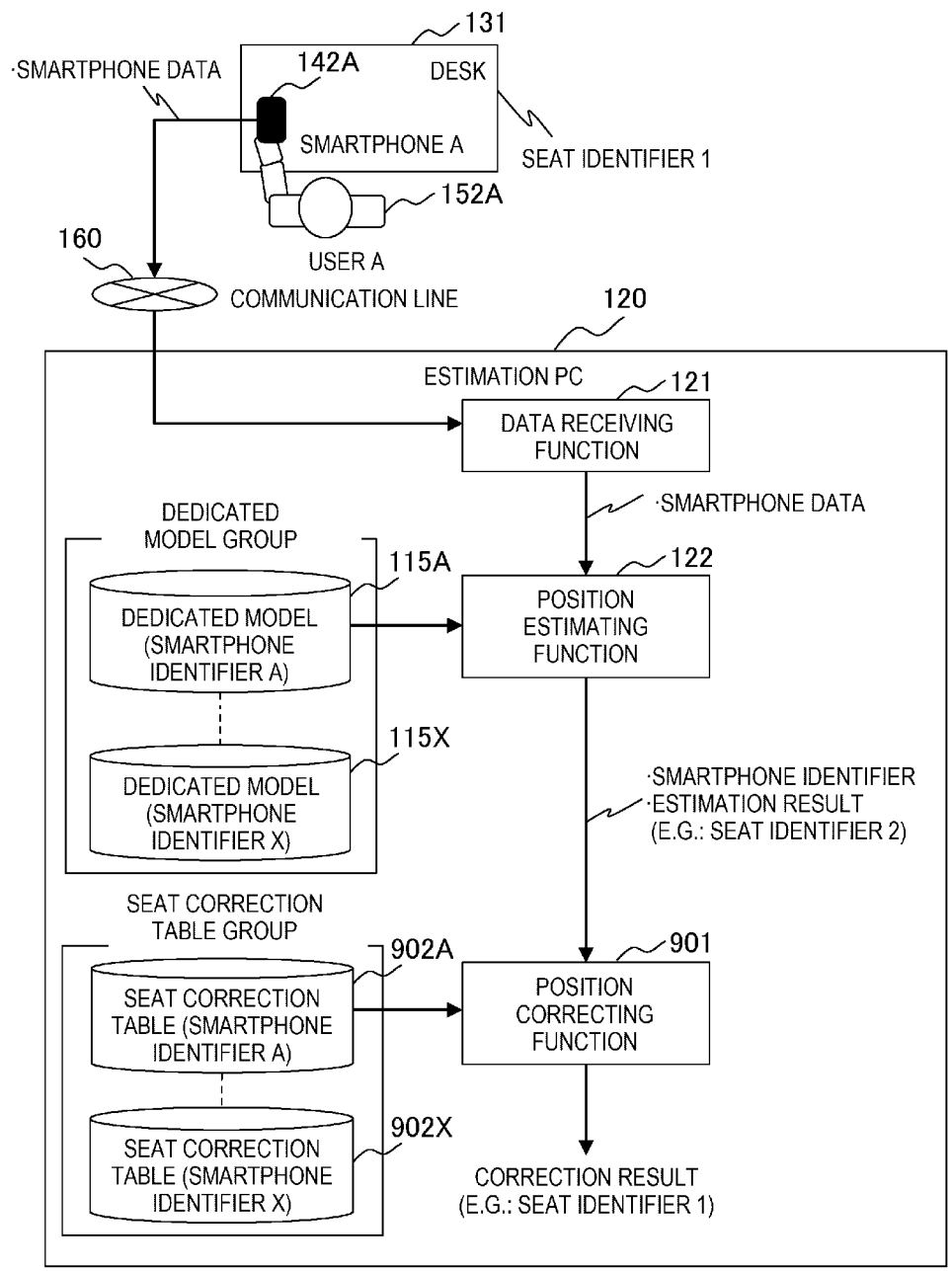
FIG. 9 is an explanatory diagram illustrating an example of a processing by an estimation PC of a position estimation system according to a second embodiment of the invention.

FIG. 9 is an explanatory diagram illustrating an example of a processing by the estimation PC 120 of the position estimation system 100 according to the second embodiment of the invention. The estimation PC 120 constituting the position estimation system 100 of the second embodiment stores, for example, the dedicated model 115 corresponding to each smartphone 142 created by the method shown in FIG. 4 and a seat correction table 902 corresponding to each smartphone 142. The dedicated model 115 and the seat correction table 902 are, for example, stored in the auxiliary storage device 803 of the PC 800 that implements the estimation PC 120. In the example of FIG. 9, a dedicated model 115A and a seat correction table 902A corresponding to the smartphone A 142A whose smartphone identifier is "A" to a dedicated model 115X and a seat correction table 902X corresponding to a smartphone whose smartphone identifier is "X" (not shown) are stored.

In FIG. 9, the smartphone A 142A transmits the smartphone data, the data receiving function 121 of the estimation PC 120 receives the smartphone data, and the position estimating function 122 executes the position estimation using the dedicated model 115A as a position estimation model dedicated to the smartphone A 142A. Such processing is the same as the processing in the first embodiment of the position estimating function 122 executing the position estimation when the dedicated model 115 is used instead of the general-purpose model 113 of FIG. 1. The position estimating function 122 outputs the identifier of the smartphone A 142A and the seat identifier acquired as the estimation result (for example, a seat identifier "2").

Next, a position correcting function 901 of the estimation PC 120 executes position correction with reference to the seat correction table 902A corresponding to the smartphone A 142A, and outputs a result thereof. For example, the seat identifier "2" as the output of the position estimating function 122 may be corrected to the seat identifier "1" and output by the position correcting function 901. The position correcting function 901 is implemented by, for example, the processor 801 of the PC 800, which corresponds to the estimation PC 120, executing the programs stored in the memory 802.

FIG. 10 is an explanatory diagram illustrating an example of the seat correction table 902 in the position estimation system 100 according to the second embodiment of the invention.

FIG. 10 shows, as an example, the seat correction table 902A corresponding to the smartphone A 142A. The seat correction table 902A includes a pre-correction seat identifier 1001 and a post-correction seat identifier 1002. In the example of FIG. 10, "1" is stored as the post-correction seat identifier 1002 corresponding to the value of the pre-correction seat identifier 1001, and "1" is stored as the post-correction seat identifier 1002 corresponding to the value "2" of the pre-correction seat identifier 1001.

As will be described later, the above values are stored in the seat correction table 902A when, for example, the user A 152A has a use record of the seat having the seat identifier "1" but does not have a use record of the seat having the seat identifier "2", and the seat identifier is output as the position estimation result in spite of the user A 152A actually using the seat having the seat identifier "1".

When the position estimating function 122 outputs the seat identifier "1" as the estimation result, the position correcting function 901 refers to the seat correction table 902A and outputs the value "1" of the post-correction seat identifier 1002 corresponding to the value "1" of the pre-correction seat identifier 1001 as a correction result. On the other hand, when the position estimating function 122 outputs the seat identifier "2" as the estimation result, the position correcting function 901 refers to the seat correction table 902A and outputs the value "1" of the post-correction seat identifier 1002 corresponding to the value "2" of the pre-correction seat identifier 1001 as the correction result. When the seat identifier output as the estimation result by the position estimating function 122 is not included in the pre-correction seat identifier 1001, the position correcting function 901 outputs the estimation result by the position estimating function 122 as it is without performing correction.

Although being omitted in FIG. 10, the seat correction table 902A may further include information associating other values of the pre-correction seat identifier 1001 with the values of the post-correction seat identifier 1002, as will be described later.

Figure 11:
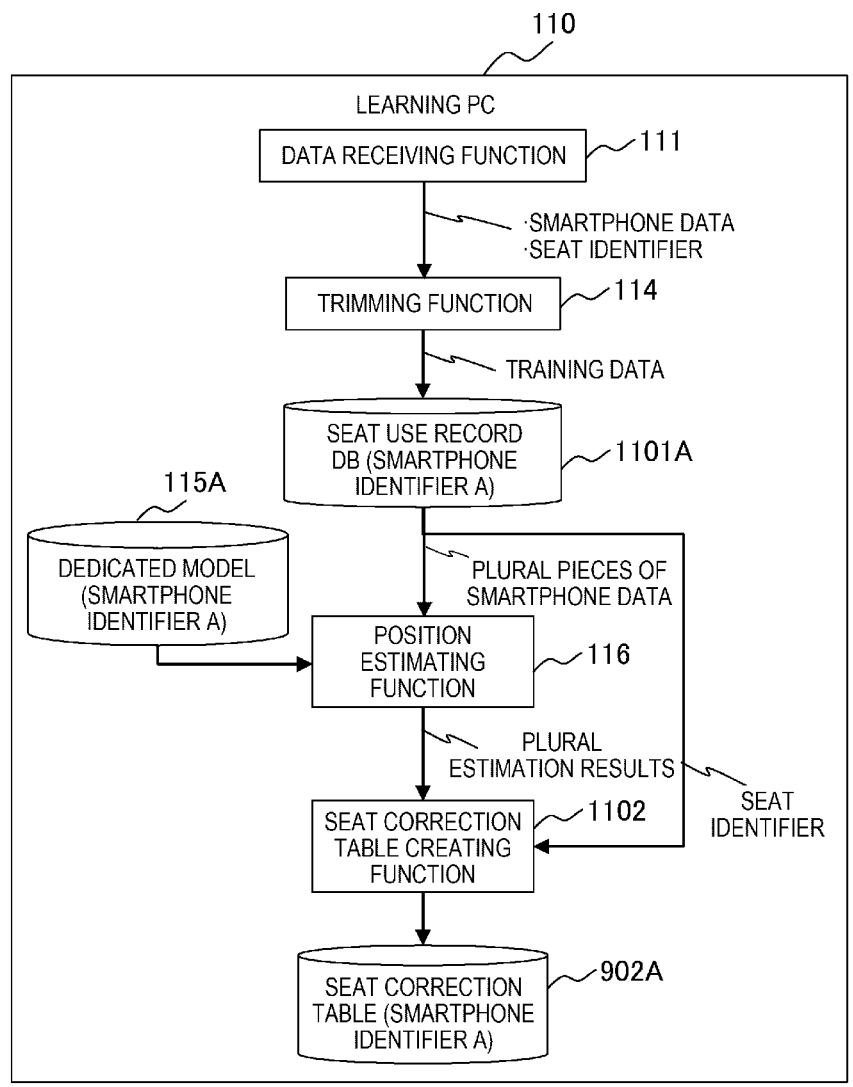
FIG. 11 is an explanatory diagram illustrating an example of a processing by a learning PC of the position estimation system according to the second embodiment of the invention.

FIG. 11 is an explanatory diagram illustrating an example of the processing by the learning PC 110 of the position estimation system 100 according to the second embodiment of the invention.

The learning PC 110 of the second embodiment creates the general-purpose model 113 and the dedicated model 115 (or the quasi-dedicated model 119) in the same manner as the learning PC 110 of the first embodiment. FIG. 11 shows an example of a processing in which the learning PC 110 creates the dedicated model 115 and then creates the seat correction table 902 using this dedicated model 115.

The data received by the data receiving function 111, and the processings by the data receiving function 111 and the trimming function 114 are the same as those described with reference to FIG. 7.

A seat use record database (DB) 1101A is created based on the training data output by the trimming function 114. The seat use record database (DB) 1101A includes the seat identifier included in the training data (that is, the correct seat identifier).

The position estimating function 116 executes the position estimation using the smartphone data such as the radio wave intensity included in the training data and the dedicated model 115A, and outputs the seat identifier as the estimation result. This processing is executed on plural pieces of training data acquired by the learning PC 110, and plural estimation results are acquired.

A seat correction table creating function 1102 creates and outputs the seat correction table 902A based on the seat identifier as the estimation result output from the position estimating function 116 and the correct seat identifier acquired from the training data. Details of this processing will be described later (see FIG. 12).

The seat correction table creating function 1102 is implemented by, for example, the processor 801 of the PC 800, which corresponds to the learning PC 110, executing the programs stored in the memory 802. The same also applies to a seat use rate calculating function (see FIG. 13) to be described later. The seat use record DB 1101A is stored, for example, in the auxiliary storage device 803 of the PC 800 which implements the learning PC 110.

Figure 12:
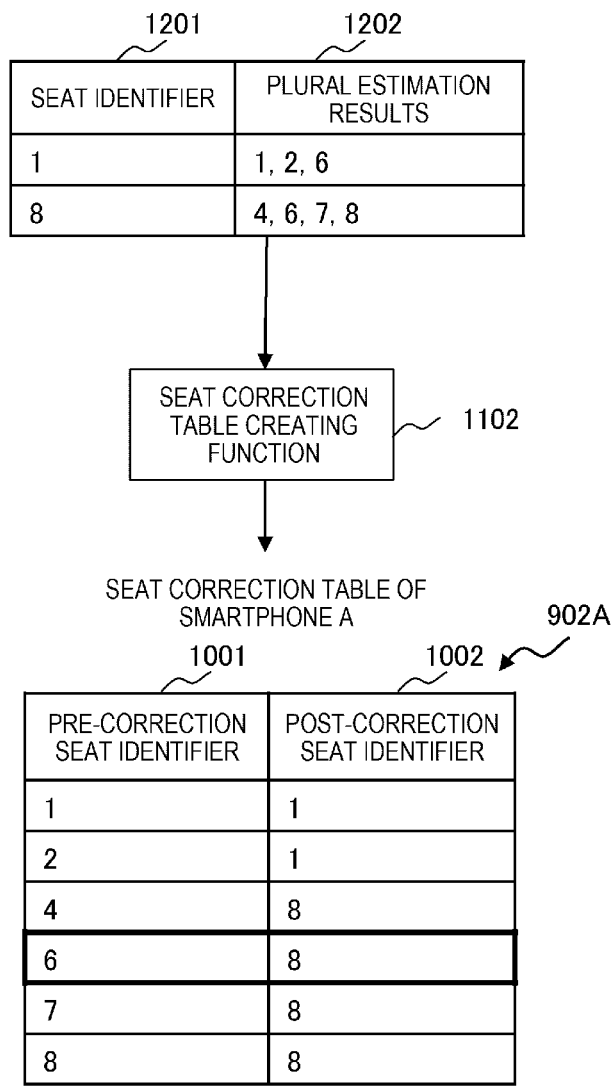
FIG. 12 is an explanatory diagram illustrating an example of a processing by a seat correction table creating function of the position estimation system according to the second embodiment of the invention.

FIG. 12 is an explanatory diagram illustrating an example of a processing by the seat correction table creating function 1102 of the position estimation system 100 according to the second embodiment of the invention.

The seat correction table creating function 1102 acquires plural estimation results 1202 output from the position estimating function 116 and seat identifiers 1201 included in the training data corresponding to the estimation results. In the example of FIG. 12, "1", "2" and "6" are acquired as values of the plural estimation results 1202 corresponding to the value "1" of the seat identifier 1201, and "4", "6", "7" and "8" are acquired as the values of the plural estimation results 1202 corresponding to the value "2" of the seat identifier 1201, respectively. This shows that the user A 152A has used the seat having the seat identifier "1" multiple times and the seat identifiers "1", "2" and "6" have been acquired as the position estimation result based on the measurement data of the smartphone A 142A at that time, and that the user A 152A has used the seat with the seat identifier "8" multiple times, and the seat identifiers "4", "6", "7" and "8" have been acquired as the position estimation result based on the measurement data of the smartphone A 142A at that time.

The seat correction table creating function 1102 stores the values of the seat identifiers included in the plural estimation results 1202 and the corresponding values of the seat identifier 1201 in association with the pre-correction seat identifier 1001 and the post-correction seat identifier 1002 of the seat correction table 902A.

Here, the seat actually used may be different even if the estimation results based on the measurement data are the same. In the example of FIG. 12, the plural estimation results 1202 corresponding to the value "1" of the seat identifier 1201 include "6", and the plural estimation results 1202 corresponding to the value "8" of the seat identifier 1201 also include "6". This shows that "6" has been acquired as the position estimation result based on the measurement data when the user A 152A actually uses the seat having the seat identifier "1", and further, "6" has also been acquired as the position estimation result based on the measurement data when the user A 152A actually uses the seat having the seat identifier "8".

In such a case, the seat correction table creating function 1102 may store a value randomly selected from "1" and "8" as the value of the post-correction seat identifier 1002 corresponding to the value "6" of the pre-correction seat identifier 1001. In the example of FIG. 12, "8" is stored.

Figure 13:
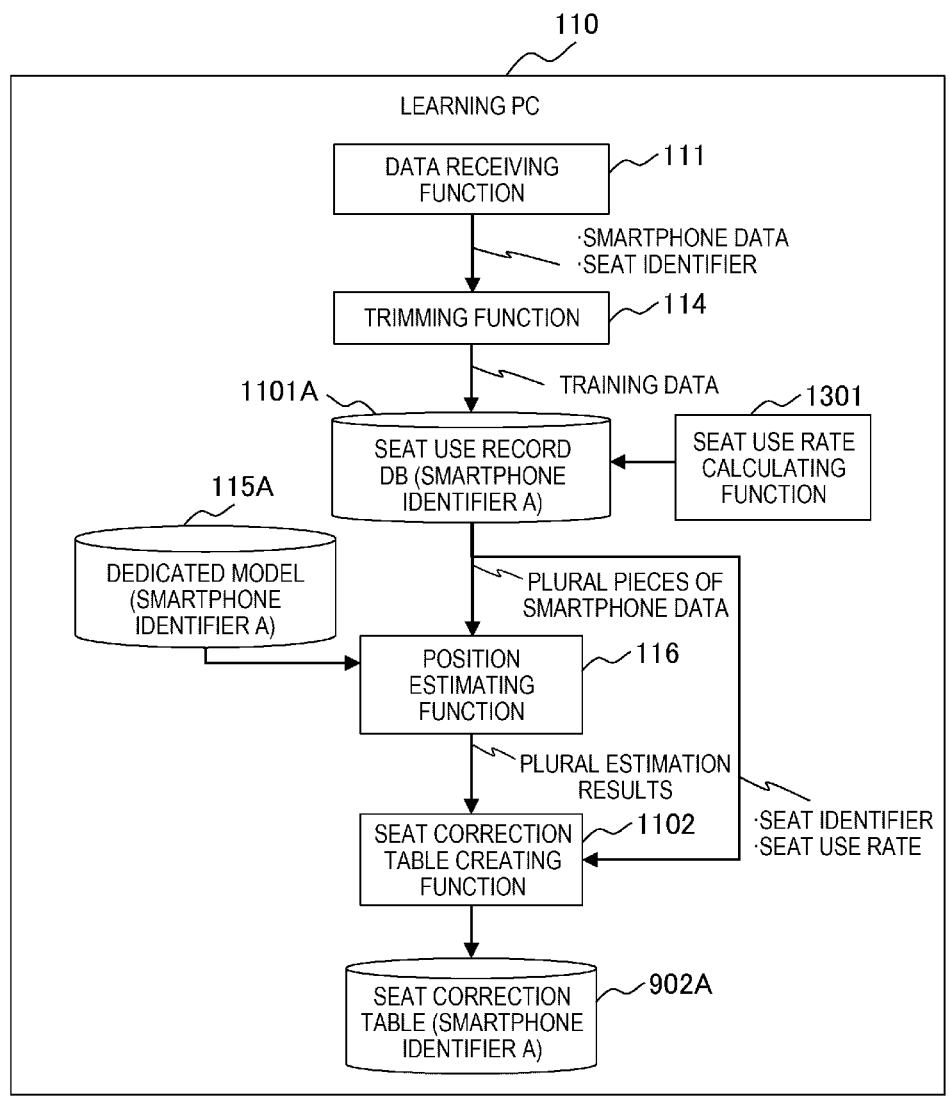
FIG. 13 is an explanatory diagram illustrating another example of the processing by the learning PC of the position estimation system according to the second embodiment of the invention.

FIG. 13 is an explanatory diagram illustrating another example of the processing by the learning PC 110 of the position estimation system 100 according to the second embodiment of the invention.

The learning PC 110 of the second embodiment may execute a processing shown in FIG. 13 instead of the processing shown in FIG. 11. Differences from the processing shown in FIG. 11 will be described with reference to FIG. 13.

The learning PC 110 further includes a seat use rate calculating function 1301. The seat use rate calculating function 1301 calculates a ratio of the number of times of use of each seat with respect to the total number of times of use of all seats having a use record by the user A 152A as the seat use rate (that is, a stay frequency in the seat) based on the seat identifiers obtained from the smartphone A 142A. The seat correction table creating function 1102 creates the seat correction table 902A with reference to the seat use rate. Details of this processing will be described later (see FIG. 14).

Figure 14:
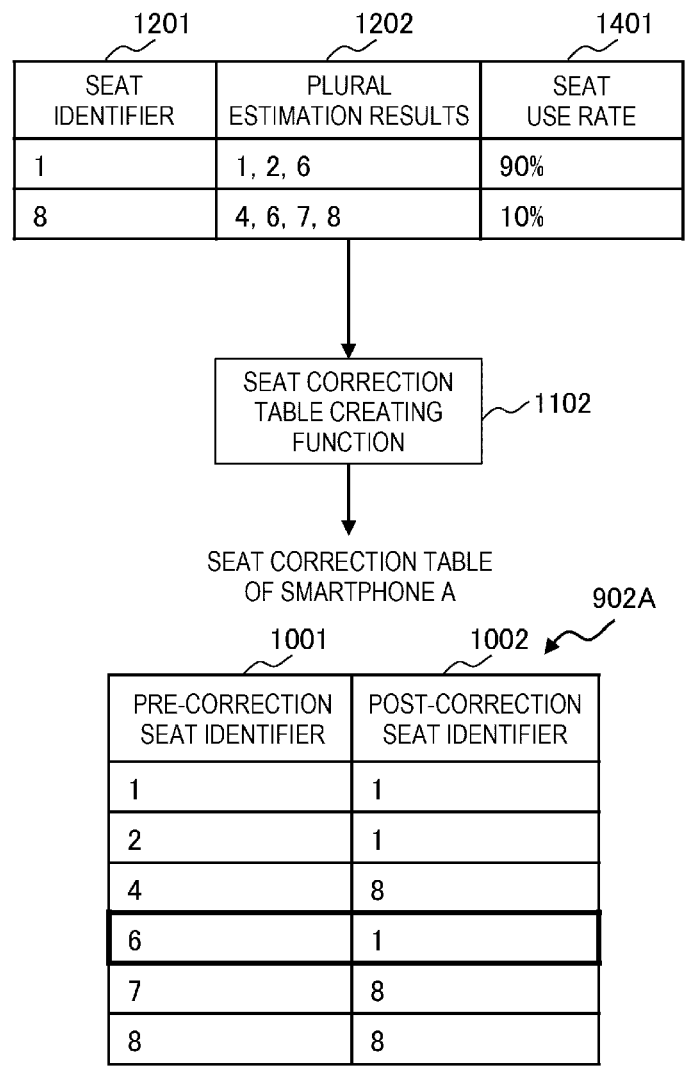
FIG. 14 is an explanatory diagram illustrating another example of the processing by the seat correction table creating function of the position estimation system according to the second embodiment of the invention.

FIG. 14 is an explanatory diagram illustrating another example of the processing by the seat correction table creating function 1102 of the position estimation system 100 according to the second embodiment of the invention.

A seat use rate 1401 is a use rate of the seat corresponding to the value of the seat identifier 1201. The example of FIG. 14 shows that the seat having the seat identifier "1" and the seat having the seat identifier "8" have a use record by the user A 152A, and the ratio of the number of times of use of the seat having the seat identifier "1" with respect to the total number of times of use is 90%.

In the processing of FIG. 14, when plural values of the seat identifier 1201 correspond to the same value of the plural estimation results 1202, a value of the seat identifier 1201 having a highest seat use rate 1401 among these values is stored as the post-correction seat identifier 1002. In the example of FIG. 14, "1" is stored as the value of the post-correction seat identifier 1002 corresponding to the value "6" of the pre-correction seat identifier 1001.

In the above second embodiment, an example in which the position estimating function 122 and the position estimating function 116 use the dedicated model 115 is described, whereas the position estimating function 122 and the position estimating function 116 may also use the general-purpose model 113 or the quasi-dedicated model 119.

According to the above second embodiment, since the position estimation result is limited to the seats having a use record by the users, it can be expected that the accuracy of estimation will be improved especially in a situation where the seats used by the users are generally limited to a small number of specific seats.

Third Embodiment

Next, the third embodiment of the invention will be described. Since each unit of the system of the third embodiment has the same functions as those of each unit denoted by the same reference numerals of the first and second embodiments shown in FIGS. 1 to 14 except for differences to be described below, the description thereof will be omitted.

Figure 15:
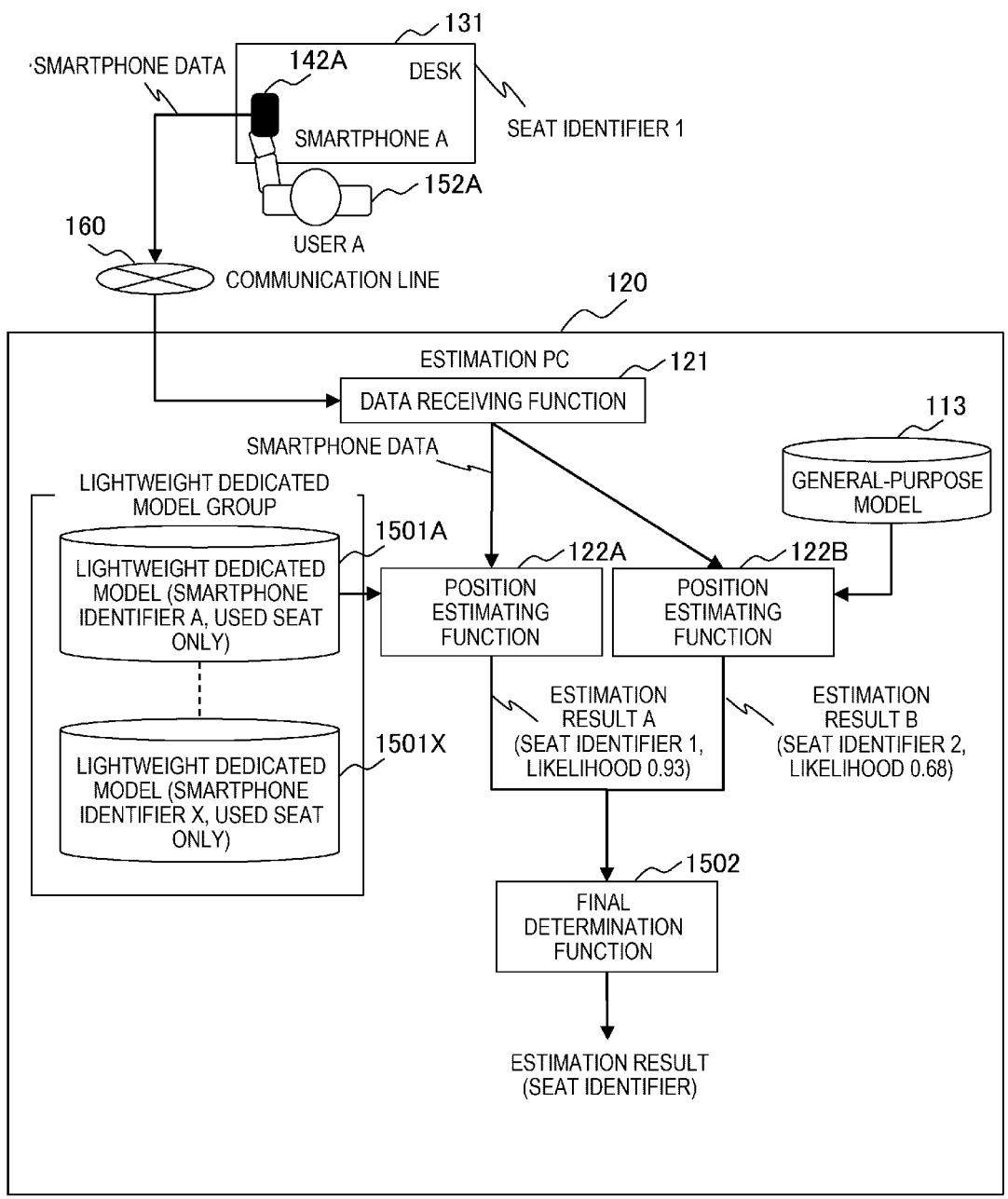
FIG. 15 is an explanatory diagram illustrating an example of a processing by an estimation PC of a position estimation system according to a third embodiment of the invention.

FIG. 15 is an explanatory diagram illustrating an example of the processing by the estimation PC 120 of the position estimation system 100 according to the third embodiment of the invention.

The estimation PC 120 of the third embodiment includes a position estimating function 122A, a position estimating function 122B, a final determination function 1502 and a lightweight dedicated model 1501. The position estimating function 122A, the position estimating function 122B and the final determination function 1502 are implemented by, for example, the processor 801 executing the programs stored in the memory 802 of the PC 800 which corresponds to the estimation PC 120. The lightweight dedicated model 1501 is stored, for example, in the auxiliary storage device 803 of the PC 800 which corresponds to the estimation PC 120.

In the example of FIG. 15, a lightweight dedicated model 1501A corresponding to the smartphone A 142A whose smartphone identifier is "A" to a lightweight dedicated model 1501X corresponding to the smartphone whose smartphone identifier is "X" (not shown) are stored. Similar to each dedicated model 115, each lightweight dedicated model 1501 corresponds to each smartphone identifier, and is created by the learning PC 110 with the same processing as in FIG. 4.

However, the training data for the general-purpose model 113 is not used when the lightweight dedicated model 1501 is created. As a result, the lightweight dedicated model 1501 becomes a position estimation model that outputs only seat identifiers having a use record by the user 152 corresponding to the lightweight dedicated model (that is, the user who carries the smartphone 142 identified by the smartphone identifier corresponding to the lightweight dedicated model) as the estimation result.

For example, when the seat identifiers of the seats having a use record by the user A 152A are only "1", "2" and "3" while the other seats have not been used, the lightweight dedicated model 1501A corresponding to the user A 152A is a model for estimating at which one of the seats having the seat identifiers "1", "2" and "3" the smartphone A 142A is placed based on the smartphone data acquired from the smartphone A 142A.

The position estimating functions 122A and 122B have the same function as that of the position estimating function 122 described in the first and second embodiments. In FIG. 15, the position estimating functions 122A and 122B are illustrated separately for convenience of description, but may actually be one single position estimating function 122.

Here, a procedure of the position estimation when the user A 152A who carries the smartphone A 142A uses the seat having the seat identifier "1" will be described with reference to FIG. 15. The general-purpose model 113 is loaded when the estimation PC 120 is started. Further, the lightweight dedicated model 1501 is loaded when the position estimation is to be executed. The processing until the data receiving function 121 receives the smartphone data is the same as that described with reference to FIG. 1 or FIG. 9.

The position estimating function 122A inputs the smartphone data received by the data receiving function 121 into the lightweight dedicated model 1501A to execute the position estimation. For example, when the lightweight dedicated model 1501A is a model that outputs one of the seat identifiers "1", "2" and "3" as the estimation result as described above, one of the seat identifiers and the likelihood thereof are output.

The position estimating function 122B inputs the smartphone data received by the data receiving function 121 into the general-purpose model 113 to execute the position estimation. As a result, one of the seat identifiers of all seats and the likelihood thereof are output as the estimation result.

The final determination function 1502 compares the likelihood of the estimation result by the position estimating function 122A with the likelihood of the estimation result by the position estimating function 122B, and outputs the estimation result having the higher likelihood as a final estimation result.

In the example of FIG. 15, the seat identifier "1" and the likelihood "0.93" are output as the estimation result of the position estimating function 122A, and the seat identifier "2" and the likelihood "0.68" are output as the estimation result of the position estimating function 122B. In such a case, the final determination function 1502 outputs the seat identifier "1", which has the higher likelihood, as the final estimation result.

In this way, it is considered that when the user 152 uses a seat having a use record by the user 152, a highly-accurate estimation result can be acquired as in the case of using the dedicated model 115.

On the other hand, the position estimating function 122A outputs one of the seat identifiers "1" to "3" and the likelihood thereof as the estimation result even when, for example, the user A 152A uses for the first time the seat having the seat identifier "48" which has never been used. However, the likelihood thereof is assumed to be low. On the other hand, the position estimating function 122B may output the seat identifier "48" as the estimation result based on the general-purpose model 113. If the likelihood output from the position estimating function 122B is greater than that output from the position estimating function 122A, the estimation result by the position estimating function 122B is output as the final estimation result.

FIG. 15 shows an example in which the position estimating function 122B uses the general-purpose model 113, whereas the position estimating function 122B may also use the quasi-dedicated model 119 instead of the general-purpose model 113.

The dedicated model 115 is a model that is individually prepared for each of all smartphones 142 and outputs one of all seats as the estimation result. In contrast, the lightweight dedicated model 1501 is individually prepared for each of all smartphones 142, but outputs one of the seats having a use record by the corresponding user 152 as the estimation result. Therefore, the amount of data of the lightweight dedicated model 1501 is smaller than the amount of data of the dedicated model 115. Accordingly, especially when the number of the users 152 as subjects for the position estimation is large, the total amount of memory reserved for loading the lightweight dedicated model 1501 is smaller, and the cost is reduced as compared to the case of loading the dedicated model 115. In addition, when the user 152 uses a seat having a use record by the user 152, the position estimation error can be reduced to a level equal to that in the case of using the dedicated model 115.

Fourth Embodiment

Next, the fourth embodiment of the invention will be described. Since each unit of the system of the fourth embodiment has the same functions as those of each unit denoted by the same reference numerals of the first embodiment to the third embodiment shown in FIGS. 1 to 15 except for differences to be described below, the descriptions thereof will be omitted.

Figure 16:
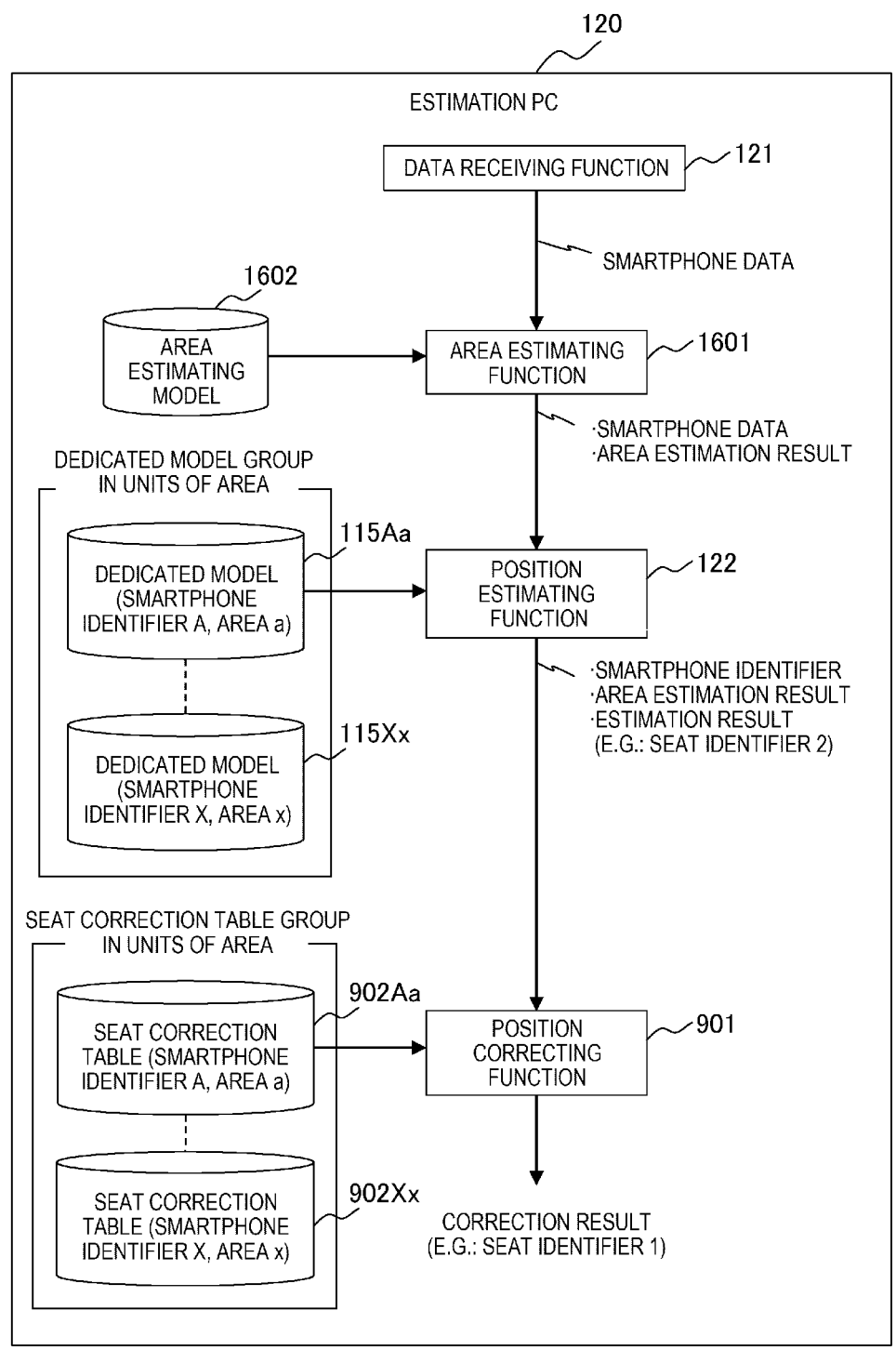
FIG. 16 is an explanatory diagram illustrating an example of a processing by an estimation PC of a position estimation system according to a fourth embodiment of the invention.

FIG. 16 is an explanatory diagram illustrating an example of the processing by the estimation PC 120 of the position estimation system 100 according to the fourth embodiment of the invention.

The estimation PC 120 of the fourth embodiment includes an area estimating function 1601 and an area estimating model 1602. The area estimating function 1601 is implemented by, for example, the processor 801 executing the programs stored in the memory 802 of the PC 800 which corresponds to the estimation PC 120. The area estimating model 1602 is stored, for example, in the auxiliary storage device 803 of the PC 800 which corresponds to the estimation PC 120.

An area is a region obtained by dividing the space as the subject for the position estimation in any mode of division. For example, one floor of the room shown in FIG. 2 may be divided into plural areas. Each seat is included in one of the areas. For example, an area a may be set to include seats having the seat identifiers "1" to "24", and an area b may be set to include seats having the seat identifiers "25" to "48". Alternatively, for example, the area a may be set to include a set (so-called group) of seats having the seat identifiers "1" to "8", and the area b may be set to include a group of seats having the seat identifiers "9" to "16". Alternatively, when the space as the subject includes plural floors, each floor may be set to be included in a different area.

The area estimating model 1602 is created by the learning PC 110. Specifically, the model creating function 112 of the learning PC creates the area estimating model 1602 by executing the same processing as that shown in FIG. 1. However, at this time, the seat identifier 301 of the training data 300 is converted into an area identifier based on an area correspondence table (see FIGS. 17 and 18) to be described later. Thereby, the learning PC generates the area estimating model 1602 for estimating the area where the smartphone 142 is placed based on the smartphone data including the radio wave intensity and the like acquired from the smartphone 142.

The learning PC 110 of the fourth embodiment creates the dedicated model 115 for each area. For example, the model creating function 112 of the learning PC 110 creates the dedicated model 115 for estimating the position when the smartphone A 142A carried by the user A 152A is in the area a by using, as the training data, the smartphone data acquired by the smartphone A 142A when the user A 152A uses the seat in the area a and the seat identifier at that time. Such a dedicated model 115 corresponding to the smartphone A 142A and the area a is also referred to as a dedicated model 115Aa. This dedicated model is a position estimation model for estimating in which seat in the area a the user A 152A is seated.

For example, the model creating function 112 uses the training data acquired by replacing the training data corresponding to the seat used by the user A 152A of the training data for general-purpose model 113 acquired in the area a with the training data including user data measured by the smartphone A 142A when the user A 152A uses the seat to create the dedicated model 115Aa. The same applies to the other users 152 and the dedicated models 115 corresponding to other areas.

The amount of data of such a dedicated model 115Aa is smaller than the amount of data of the dedicated model 115A for estimating in which seat of all seats the user A 152A is seated. FIG. 16 shows, as an example, the dedicated model 115Aa to a dedicated model 115Xx.

Further, the learning PC 110 of the fourth embodiment creates the seat correction table 902 for each area. For example, the seat correction table creating function 1102 of the learning PC 110 creates, based on the seat identifier estimated by the position estimating function 116 and the area to which the seat belongs, the seat correction table 902 corresponding to the combination of the identifier of the smartphone 142 and the area. For example, a seat correction table 902Aa shown in FIG. 16 is a seat correction table when the smartphone A 142A of the user A 152A is determined to be in the area a.

Here, the processing by the estimation PC 120 of the fourth embodiment will be described with reference to FIG. 16. Here, similar to FIGS. 1, 9 and 15, a case where the estimation PC 120 receives the smartphone data from the smartphone A 142A of the user A 152A will be described. The processing until the data receiving function 121 receives the smartphone data is the same as that described with reference to FIGS. 1, 9 and 15.

The area estimating function 1601 inputs the received smartphone data into the area estimating model 1602 and outputs the area identifier acquired as the estimation result. The position estimating function 122 performs the position estimation based on the smartphone data and the area identifier. For example, when "a" is output as the area identifier, the position estimating function 122 inputs the smartphone data to the dedicated model 115Aa corresponding to the smartphone A 142A of the user A 152A and the area a, and outputs the seat identifier in the area a as the estimation result.

The position correcting function 901 refers to the seat correction table 902Aa corresponding to the smartphone A 142A of the user A 152A and the area a to correct the seat identifier of the estimation result output from the position estimating function 122, and outputs this result.

The estimation PC 120 of the fourth embodiment loads the area estimating model 1602 at start-up. Then, when the area is estimated by the area estimating function 1601, the estimation PC 120 loads the dedicated model 115 corresponding to the estimated area. Accordingly, the cost of reserving the memory for loading the dedicated model 115 is reduced as compared with the case of loading the dedicated model 115 of the first embodiment. Further, since the dedicated model 115 is used, it is expected that the position estimation error is reduced as compared with the case where the general-purpose model 113 is used.

FIG. 17 is an explanatory diagram illustrating an example of the area correspondence table stored in the position estimation system according to the fourth embodiment of the invention.

An area correspondence table 1700 is stored, for example, in the auxiliary storage device 803 of the PC 800 which corresponds to the learning PC 110. The area correspondence table 1700 includes a seat identifier 1701 and an area identifier 1702. In the example of FIG. 17, the seat identifiers "1" to "12" are associated with the area identifier "a", and the seat identifiers "13" to "24" are associated with the area identifier "b". This shows that the seats having the seat identifiers "1" to "12" are included in the area a, and the seats having the seat identifiers "13" to "24" are included in the area b.

Figure 18:
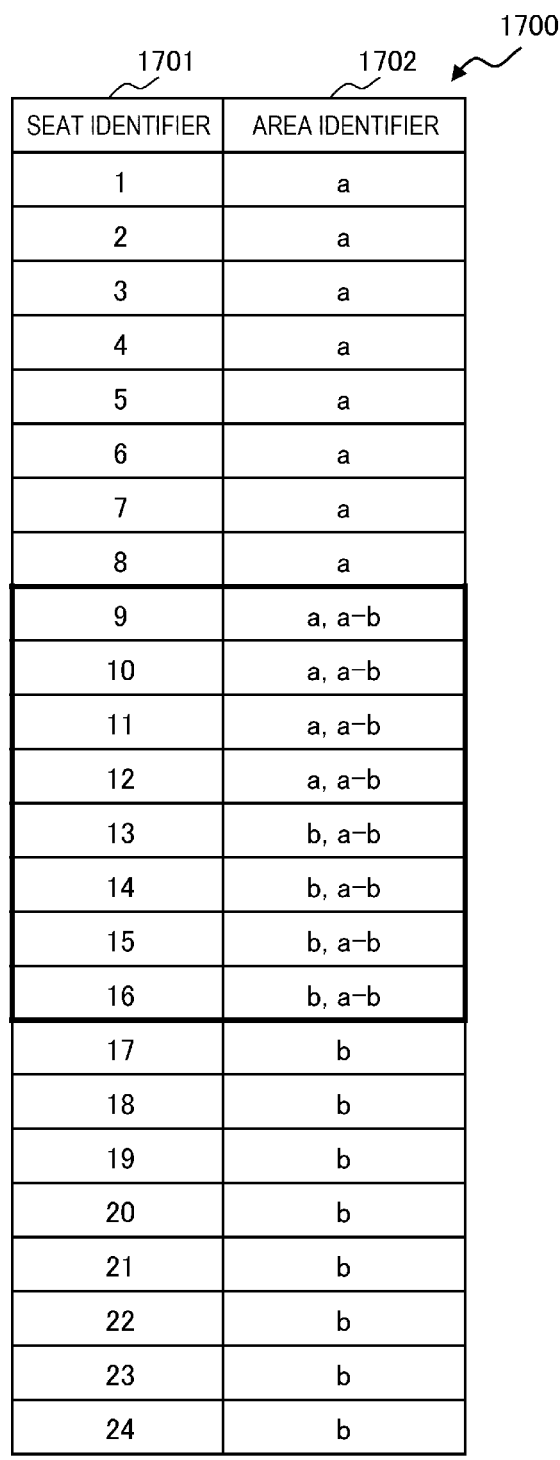
FIG. 18 is an explanatory diagram illustrating another example of the area correspondence table stored in the position estimation system according to the fourth embodiment of the invention.

FIG. 18 is an explanatory diagram illustrating another example of the area correspondence table stored in the position estimation system according to the fourth embodiment of the invention.

In the example of FIG. 18, the seat identifiers "1" to "12" are associated with the area identifier "a", and the seat identifiers "13" to "24" are associated with the area identifier "b". In addition, the seat identifiers "9" to "16" are also associated with an area identifier "a-b".

This shows that the seats having the seat identifiers "1" to "8" are included only in the area a, the seats having the seat identifiers "9" to "12" are included in both the areas a and a-b, the seats having the seat identifiers "13" to "16" are included in both the areas b and a-b, and the seats having the seat identifiers "17" to "24" are included only in the area b. That is, the areas a and a-b are set in a manner partially overlapping with each other, and the areas b and a-b are also set in a manner partially overlapping with each other.

For example, when the seats are arranged as shown in FIG. 2 and the areas are set as shown in FIG. 17, the seat having the seat identifier "9" and the seat having the seat identifier "13" are adjacent to each other but belong to different areas. In such a case, for example, when the result of the area estimation by the area estimating function 1601 is not "area a" in spite of the user A 152A using the seat having the seat identifier "9", since the dedicated model 115 corresponding to the area a is not used, there is no possibility that the seat identifier "9" can be acquired as the estimation result by the position estimating function 122.

However, when the partially overlapping areas are set as shown in FIG. 18, if the result of the area estimation is "area a-b", there is a possibility that the seat identifier "9" can be acquired as the estimation result by the position estimating function 122 even if the result is not "area a". Therefore, the seat position estimation is robust for an error of the area estimation.

The system according to the embodiments of the invention may be constituted as follows.

(1) A position estimation system includes: a processor (the processor 801); and a storage device (for example, at least one of the memory 802 or the auxiliary storage device 803). The storage device stores data associating measurement data obtained by a first terminal device (for example, the smartphone 142A) with a position identifier. The measurement data includes data on at least one of a radio wave, a geomagnetism, a direction or an atmospheric pressure which are measured. The measurement data further includes data on at least one of a measured acceleration or the number of steps calculated based on the acceleration. The processor: specifies a period from when the first terminal device acquires the position identifier until when the processor determines that a user (for example, the user 152A) of the first terminal device has moved based on the acceleration or the number of steps (for example, the processing of the trimming function 114 specifying a period from the time t1 to the time t2); uses first training data including the measurement data obtained by the first terminal device during the specified period and the position identifier corresponding to the measurement data obtained by the first terminal device to create a position estimation model that outputs the position identifier as a position estimation result when the position estimation model receives the measurement data (for example, the processing by the model creating function 112); and when the processor receives the measurement data obtained by the first terminal device, estimates a position of the first terminal device by using the received measurement data and the position estimation model (for example, the processing by the position estimating function 122).

Accordingly, a highly-accurate position estimation becomes possible by acquiring appropriate training data from a terminal used by a user and learning a position estimation model.

(2) In the above (1), the storage device further stores data associating measurement data obtained by other terminal devices (for example, the smartphone 141) different from the first terminal device with respective ones of all position identifiers in a space as a subject for position estimation by the position estimation system. The first training data further includes the measurement data obtained by the other terminal devices and the position identifiers corresponding to the measurement data obtained by the other terminal devices. The processor uses the first training data to create a position estimation model (for example, the dedicated model 115) that outputs one of all the position identifiers in the space as the subject for the estimation by the position estimation system as a position estimation result when the position estimation model receives the measurement data.

Accordingly, the position estimation model dedicated for each user is created, and the highly-accurate position estimation becomes possible.

(3) In the above (2), the storage device further stores data associating measurement data obtained by a second terminal device (for example, the smartphone 142B) different from the first terminal device with the position identifier. The other terminal devices are different from both the first terminal device and the second terminal device. The processor: uses the first training data to create, as a position estimation model (for example, the dedicated model 115A) corresponding to an identifier of the first terminal device, a position estimation model that outputs one of all the position identifiers in the space as the subject for the estimation by the position estimation system as a position estimation result of the first terminal device when the position estimation model receives the measurement data; uses second training data including the measurement data obtained by the second terminal device, the position identifier corresponding to the measurement data obtained by the second terminal device, the measurement data obtained by the other terminal devices, and the position identifiers corresponding to the measurement data obtained by the other terminal devices to create, as a position estimation model (for example, the dedicated model 115B) corresponding to an identifier of the second terminal device, a position estimation model that outputs one of all the position identifiers in the space as the subject for the estimation by the position estimation system as a position estimation result of the second terminal device when the position estimation model receives the measurement data; when the processor receives the identifier of the first terminal device and the measurement data obtained by the first terminal device, uses the received measurement data and the position estimation model corresponding to the identifier of the first terminal device to estimate the position of the first terminal device; and when the processor receives the identifier of the second terminal device and the measurement data obtained by the second terminal device, uses the received measurement data and the position estimation model corresponding to the identifier of the second terminal device to estimate a position of the second terminal device.

Accordingly, the position estimation model dedicated for each user is created, and the highly-accurate position estimation becomes possible.

(4) In the above (2), the storage device further stores data associating measurement data obtained by a second terminal device different from the first terminal device with the position identifier. The other terminal devices are different from both the first terminal device and the second terminal device. The first training data further includes the measurement data obtained by the second terminal device and the position identifier corresponding to the measurement data obtained by the second terminal device. The processor: uses the first training data to create a position estimation model (for example, the quasi-dedicated model 119) that outputs one of all the position identifiers in the space as the subject for the estimation by the position estimation system as a position estimation result when the position estimation model receives the measurement data; and when the processor receives the measurement data obtained by one of the terminal devices, estimates a position of the one of the terminal devices by using the received measurement data and the position estimation model.

Accordingly, the highly-accurate position estimation is achieved as compared to a general-purpose position estimation model, and it is possible to reduce the cost for reserving a storage area by reducing the amount of data for the position estimation model.

(5) In the above (2), the processor: uses third training data including the measurement data obtained by the other terminal devices and the position identifiers corresponding to the measurement data obtained by the other terminal devices to create, as a general-purpose position estimation model (for example, the general-purpose model 113), a position estimation model that outputs one of all the position identifiers in the space as the subject for the estimation by the position estimation system as a position estimation result when the position estimation model receives the measurement data; when the processor receives the measurement data obtained by the first terminal device, estimates the position of the first terminal device by using the received measurement data and the general-purpose position estimation model (for example, the processing by the position estimating function 116); calculates an error in the position of the first terminal device estimated by using the general-purpose position estimation model (for example, the processing by the position estimation error calculating function 117); when the error exceeds a predetermined criteria, uses the first training data to create, as a position estimation model corresponding to an identifier of the first terminal device, a position estimation model that outputs one of all the position identifiers in the space as the subject for the estimation by the position estimation system as a position estimation result of the first terminal device when the position estimation model receives the measurement data (for example, the processing by the model creating function 112 when the model creation necessity determining function 118 determines that it is necessary to create the model); and when the processor receives the identifier of the first terminal device and the measurement data obtained by the first terminal device, uses the received measurement data and the position estimation model corresponding to the identifier of the first terminal device to estimate the position of the first terminal device.

Accordingly, when a position estimation result with sufficiently high accuracy can be achieved even with the general-purpose position estimation model, it is not necessary to create the position estimation model dedicated to each user, and the costs for reserving the storage area and for calculation are reduced.

(6) In the above (2), the processor: creates position correction data (for example, the seat correction table 902) for correcting a position identifier acquired as the position estimation result of the first terminal device by using the measurement data obtained by the first terminal device corresponding to the position identifier and the position estimation model to the position identifier corresponding to the measurement data, and stores the position correction data in the storage device; and when the processor receives the measurement data obtained by the first terminal device, corrects the position identifier acquired as the position estimation of the first terminal device by using the received measurement data and the position estimation model based on the position correction data (for example, the processing by the position correcting function 901).

Accordingly, the highly-accurate position estimation becomes possible.

(7) In the above (6), the processor: estimates the position of the first terminal device by using the position estimation model with respect to a plurality of sets of the position identifier and the measurement data obtained by the first terminal device corresponding to the position identifier; and when the position estimation result based on the measurement data corresponding to a first position identifier and the position estimation result based on the measurement data corresponding to a second position identifier are the same, creates position correction data for correcting the position identifier acquired as the estimation result to a position identifier having a higher stay frequency (for example, the seat use rate 1401) of the user of the first terminal device among the first position and the second position.

Accordingly, the highly-accurate position estimation becomes possible.

(8) In the above (1), the position estimation model created by using the first training data is a position estimation model (for example, the lightweight dedicated model 1501A) corresponding to an identifier of the first terminal device that outputs one of position identifiers having a stay record by the user of the first terminal device as a position estimation result of the first terminal device when the position estimation model receives the measurement data obtained by the first terminal device. The processor: uses third training data including measurement data obtained by other terminal devices and position identifiers corresponding to the measurement data obtained by the other terminal devices to create, as a general-purpose position estimation model, a position estimation model that outputs one of all the position identifiers in a space as a subject for estimation by the position estimation system as a position estimation result when the position estimation model receives the measurement data; when the processor receives the measurement data obtained by the first terminal device, acquires a position identifier and a likelihood as a first estimation result of the position of the first terminal device by using the received measurement data and the position estimation model corresponding to the identifier of the first terminal device (for example, the processing by the position estimating function 122A); further acquires a position identifier and a likelihood as a second estimation result of the position of the first terminal device by using the received measurement data and the general-purpose position estimation model (for example, the processing by the position estimating function 122B); and outputs one of the position identifiers having a higher likelihood among the first estimation result and the second estimation result as a final estimation result of the position of the first terminal device.

Accordingly, the highly-accurate position estimation is achieved as compared to the general-purpose position estimation model, and it is possible to reduce the cost for reserving a storage area by reducing the amount of data for the position estimation model.

(9) In the above (2), the space as the subject for the position estimation by the position estimation system is divided into a plurality of areas. The storage device further stores information (for example, the area correspondence table 1700) associating position identifiers (for example, the seat identifier 1701) with identifiers (for example, the area identifier 1702) of the areas to which positions belong. The processor: creates, as an area estimation model, a position estimation model that outputs one of the identifiers of the areas as an estimation result when the position estimation model receives the measurement data (for example, the area estimating model 1602); creates, as a position estimation model corresponding to the identifier of each area, a position estimation model (for example, the dedicated model 115Aa) for the area configured to output one of the position identifiers in the area as an estimation result when the position estimation model receives the measurement data; when the processor receives the measurement data obtained by the first terminal device, estimates the area to which the position of the first terminal device belongs by using the received measurement data and the area estimation model (for example, the processing by the area estimating function 1601); and estimates the position of the first terminal device in the area by using the measurement data and the position estimation model corresponding to the identifier of the area acquired as the estimation result of the area (for example, the processing by the position estimating function 122 of FIG. 16).

Accordingly, it is possible to reduce the cost for reserving the storage area by reducing the amount of data for the position estimation model while maintaining the accuracy of the position estimation.

(10) In the above (9), the space as the subject for the position estimation by the position estimation system is divided into the plurality of areas such that a part of at least one of the areas overlaps with a part of an area adjacent to the area (for example, the area correspondence table 1700 of FIG. 18).

Accordingly, the position estimation is robust for the error of the area estimation.

(11) In the above (1), the position identifier is an identifier of a seat (for example, the seat identifier shown in FIG. 2) arranged in a space as a subject for estimation by the position estimation system.

Accordingly, it is possible to estimate the seat used by the user in an indoor space such as an office.

(12) In the above (1), the position estimation system includes: a first computer (for example, the learning PC 110) including a first processor and a first storage device; and a second computer (for example, the estimation PC 120) including a second processor and a second storage device. The first storage device stores the data associating the measurement data obtained by the first terminal device with the position identifier. The first processor: specifies the period from when the first terminal device acquires the position identifier until when the processor determines that the user of the first terminal device has moved based on the acceleration or the number of steps; and uses the first training data to create the position estimation model that outputs the position identifier as the position estimation result when the position estimation model receives the measurement data. The second storage device stores the position estimation model. The second processor, when the second processor receives the measurement data obtained by the first terminal device, estimates the position of the first terminal device by using the received measurement data and the position estimation model.

Accordingly, it is possible to use appropriate hardware for each of the learning phase and the estimation phase.

The invention is not limited to the above-mentioned embodiments, and includes various modifications. For example, the above embodiments have been described in detail for better understanding of the invention, and are not necessarily limited to those including all the configurations described above. A part of the configuration of one embodiment can be replaced with the configuration of another embodiment, and the configuration of another embodiment can be added to the configuration of one embodiment. In addition, a part of the configuration of each embodiment may be added, deleted, or replaced with another configuration.

A part or all of the above configurations, functions, processing units, processing methods and the like may be implemented by hardware, for example, by designing an integrated circuit. In addition, each of the above configurations, functions and the like may be implemented by software by a processor interpreting and executing a program for implementing each function. Information such as a program, a table, or a file for implementing each function can be stored in a storage device such as a nonvolatile semiconductor memory, a hard disk drive, and a solid state drive (SSD), or a computer readable non-transitory data storage medium such as an IC card, an SD card, and a DVD.

Further, control lines and information lines show those considered to be necessary for description, and not all of the control lines and the information lines are necessarily shown in a product. In practice, it may be considered that almost all of the configurations are connected to each other.

What is claimed is:

1. A position estimation system comprising:
a processor; and
a storage device, wherein
the storage device is configured to store data associating measurement data obtained by a first terminal device with a position identifier,
the measurement data includes data on at least one of a radio wave, a geomagnetism, a direction or an atmospheric pressure which are measured,
the measurement data further includes data on at least one of a measured acceleration or a number of steps calculated based on the acceleration, and
the processor is configured to:
specify a period from when the first terminal device acquires the position identifier until when the processor determines that a user of the first terminal device has moved based on the acceleration or the number of steps;
use first training data including the measurement data obtained by the first terminal device during the specified period and the position identifier corresponding to the measurement data obtained by the first terminal device to create a position estimation model configured to output the position identifier as a position estimation result when the position estimation model receives the measurement data; and
when the processor receives the measurement data obtained by the first terminal device, estimate a position of the first terminal device by using the received measurement data and the position estimation model;

wherein:
the storage device is further configured to store data associating measurement data obtained by other terminal devices different from the first terminal device with respective ones of all position identifiers in a space as a subject for position estimation by the position estimation system,
the first training data further includes the measurement data obtained by the other terminal devices and the position identifiers corresponding to the measurement data obtained by the other terminal devices, and
the processor is further configured to:
use the first training data to create a position estimation model configured to output one of all the position identifiers in the space as the subject for the estimation by the position estimation system as a position estimation result when the position estimation model receives the measurement data;

use other training data including the measurement data obtained by the other terminal devices and the position identifiers corresponding to the measurement data obtained by the other terminal devices to create, as a general-purpose position estimation model, a position estimation model configured to output one of all the position identifiers in the space as the subject for the estimation by the position estimation system as a position estimation result when the position estimation model receives the measurement data;

when the processor receives the measurement data obtained by the first terminal device, estimate the position of the first terminal device by using the received measurement data and the general-purpose position estimation model;

calculate an error in the position of the first terminal device estimated by using the general-purpose position estimation model;

when the error exceeds a predetermined criteria, use the first training data to create, as a position estimation model corresponding to an identifier of the first terminal device, a position estimation model configured to output one of all the position identifiers in the space as the subject for the estimation by the position estimation system as a position estimation result of the first terminal device when the position estimation model receives the measurement data; and when the processor receives the identifier of the first terminal device and the measurement data obtained by the first terminal device, use the received measurement data and the position estimation model corresponding to the identifier of the first terminal device to estimate the position of the first terminal device.

2. The position estimation system according to claim 1, wherein the storage device is further configured to store data associating measurement data obtained by a second terminal device different from the first terminal device with the position identifier, the other terminal devices are different from both the first terminal device and the second terminal device, and the processor is configured to:

use the first training data to create, as a position estimation model corresponding to an identifier of the first terminal device, a position estimation model configured to output one of all the position identifiers in the space as the subject for the estimation by the position estimation system as a position estimation result of the first terminal device when the position estimation model receives the measurement data;

use second training data including the measurement data obtained by the second terminal device, the position identifier corresponding to the measurement data obtained by the second terminal device, the measurement data obtained by the other terminal devices, and the position identifiers corresponding to the measurement data obtained by the other terminal devices to create, as a position estimation model corresponding to an identifier of the second terminal device, a position estimation model configured to output one of all the position identifiers in the space as the subject for the estimation by the position estimation system as a position estimation result of the second terminal device when the position estimation model receives the measurement data;

when the processor receives the identifier of the first terminal device and the measurement data obtained by the first terminal device, use the received measurement data and the position estimation model corresponding to the identifier of the first terminal device to estimate the position of the first terminal device; and when the processor receives the identifier of the second terminal device and the measurement data obtained by the second terminal device, use the received measurement data and the position estimation model corresponding to the identifier of the second terminal device to estimate a position of the second terminal device.

3. The position estimation system according to claim 2, wherein the storage device is further configured to store data associating measurement data obtained by a second terminal device different from the first terminal device with the position identifier, the other terminal devices are different from both the first terminal device and the second terminal device, the first training data further includes the measurement data obtained by the second terminal device and the position identifier corresponding to the measurement data obtained by the second terminal device, and the processor is configured to:

use the first training data to create a position estimation model configured to output one of all the position identifiers in the space as the subject for the estimation by the position estimation system as a position estimation result when the position estimation model receives the measurement data; and when the processor receives the measurement data obtained by one of the terminal devices, estimate a position of the one of the terminal devices by using the received measurement data and the position estimation model.

4. The position estimation system according to claim 1, wherein the space as the subject for the position estimation by the position estimation system is divided into a plurality of areas, the storage device is further configured to store information associating position identifiers with identifiers of the areas to which positions belong, and the processor is configured to:

create, as an area estimation model, a position estimation model configured to output one of the identifiers of the areas as an estimation result when the position estimation model receives the measurement data;

create, as a position estimation model corresponding to the identifier of each area, a position estimation model for the area configured to output one of the position identifiers in the area as an estimation result when the position estimation model receives the measurement data;

when the processor receives the measurement data obtained by the first terminal device, estimate the area to which the position of the first terminal device belongs by using the received measurement data and the area estimation model; and estimate the position of the first terminal device in the area by using the measurement data and the position estimation model corresponding to the identifier of the area acquired as the estimation result of the area.

5. The position estimation system according to claim 4, wherein
the space as the subject for the position estimation by the position estimation system is divided into the plurality of areas such that a part of at least one of the areas overlaps with a part of an area adjacent to the area.

6. The position estimation system according to claim 1, wherein
the position identifier is an identifier of a seat arranged in a space as a subject for estimation by the position estimation system.

7. The position estimation system according to claim 1, comprising:
a first computer including a first processor and a first storage device; and
a second computer including a second processor and a second storage device, wherein
the first storage device is configured to store the data associating the measurement data obtained by the first terminal device with the position identifier,
the first processor is configured to:
specify the period from when the first terminal device acquires the position identifier until when the processor determines that the user of the first terminal device has moved based on the acceleration or the number of steps; and
use the first training data to create the position estimation model configured to output the position identifier as the position estimation result when the position estimation model receives the measurement data,
the second storage device is configured to store the position estimation model, and
the second processor is configured to, when the second processor receivers the measurement data obtained by the first terminal device, estimate the position of the first terminal device by using the received measurement data and the position estimation model.

8. A position estimation system comprising:
a processor; and
a storage device, wherein
the storage device is configured to store data associating measurement data obtained by a first terminal device with a position identifier,
the measurement data includes data on at least one of a radio wave, a geomagnetism, a direction or an atmospheric pressure which are measured,
the measurement data further includes data on at least one of a measured acceleration or a number of steps calculated based on the acceleration, and
the processor is configured to:
specify a period from when the first terminal device acquires the position identifier until when the processor determines that a user of the first terminal device has moved based on the acceleration or the number of steps;
use first training data including the measurement data obtained by the first terminal device during the specified period and the position identifier corresponding to the measurement data obtained by the first terminal device to create a position estimation model configured to output the position identifier as a position estimation result when the position estimation model receives the measurement data; and
when the processor receives the measurement data obtained by the first terminal device, estimate a position of the first terminal device by using the received measurement data and the position estimation model;
wherein
the storage device is further configured to store data associating measurement data obtained by other terminal devices different from the first terminal device with respective ones of all position identifiers in a space as a subject for position estimation by the position estimation system,
the first training data further includes the measurement data obtained by the other terminal devices and the position identifiers corresponding to the measurement data obtained by the other terminal devices, and
the processor is further configured to:
use the first training data to create a position estimation model configured to output one of all the position identifiers in the space as the subject for the estimation by the position estimation system as a position estimation result when the position estimation model receives the measurement data,
create position correction data for correcting a position identifier acquired as the position estimation result of the first terminal device by using the measurement data obtained by the first terminal device corresponding to the position identifier and the position estimation model to the position identifier corresponding to the measurement data, and store the position correction data in the storage device; and
when the processor receives the measurement data obtained by the first terminal device, correct the position identifier acquired as the position estimation of the first terminal device by using the received measurement data and the position estimation model based on the position correction data.

9. The position estimation system according to claim 8, wherein
the processor is configured to:
estimate the position of the first terminal device by using the position estimation model with respect to a plurality of sets of the position identifier and the measurement data obtained by the first terminal device corresponding to the position identifier; and
when the position estimation result based on the measurement data corresponding to a first position identifier and the position estimation result based on the measurement data corresponding to a second position identifier are the same, create position correction data for correcting the position identifier acquired as the estimation result to a position identifier having a higher stay frequency of the user of the first terminal device among the first position and the second position.

10. The position estimation system according to claim 8, wherein
the storage device is further configured to store data associating measurement data obtained by a second terminal device different from the first terminal device with the position identifier,
the other terminal devices are different from both the first terminal device and the second terminal device, and
the processor is configured to:
use the first training data to create, as a position estimation model corresponding to an identifier of the first terminal device, a position estimation model configured to output one of all the position identifiers in the space as the subject for the estimation by the position estimation system as a position estimation result of the first terminal device when the position estimation model receives the measurement data;

use second training data including the measurement data obtained by the second terminal device, the position identifier corresponding to the measurement data obtained by the second terminal device, the measurement data obtained by the other terminal devices, and the position identifiers corresponding to the measurement data obtained by the other terminal devices to create, as a position estimation model corresponding to an identifier of the second terminal device, a position estimation model configured to output one of all the position identifiers in the space as the subject for the estimation by the position estimation system as a position estimation result of the second terminal device when the position estimation model receives the measurement data;

when the processor receives the identifier of the first terminal device and the measurement data obtained by the first terminal device, use the received measurement data and the position estimation model corresponding to the identifier of the first terminal device to estimate the position of the first terminal device; and when the processor receives the identifier of the second terminal device and the measurement data obtained by the second terminal device, use the received measurement data and the position estimation model corresponding to the identifier of the second terminal device to estimate a position of the second terminal device.

11. The position estimation system according to claim 10, wherein the storage device is further configured to store data associating measurement data obtained by a second terminal device different from the first terminal device with the position identifier, the other terminal devices are different from both the first terminal device and the second terminal device, the first training data further includes the measurement data obtained by the second terminal device and the position identifier corresponding to the measurement data obtained by the second terminal device, and the processor is configured to:

use the first training data to create a position estimation model configured to output one of all the position identifiers in the space as the subject for the estimation by the position estimation system as a position estimation result when the position estimation model receives the measurement data; and when the processor receives the measurement data obtained by one of the terminal devices, estimate a position of the one of the terminal devices by using the received measurement data and the position estimation model.

12. The position estimation system according to claim 8, wherein the space as the subject for the position estimation by the position estimation system is divided into a plurality of areas, the storage device is further configured to store information associating position identifiers with identifiers of the areas to which positions belong, and the processor is configured to:

create, as an area estimation model, a position estimation model configured to output one of the identifiers of the areas as an estimation result when the position estimation model receives the measurement data;

create, as a position estimation model corresponding to the identifier of each area, a position estimation model for the area configured to output one of the position identifiers in the area as an estimation result when the position estimation model receives the measurement data;

when the processor receives the measurement data obtained by the first terminal device, estimate the area to which the position of the first terminal device belongs by using the received measurement data and the area estimation model; and estimate the position of the first terminal device in the area by using the measurement data and the position estimation model corresponding to the identifier of the area acquired as the estimation result of the area.

13. The position estimation system according to claim 12, wherein the space as the subject for the position estimation by the position estimation system is divided into the plurality of areas such that a part of at least one of the areas overlaps with a part of an area adjacent to the area.

14. The position estimation system according to claim 8, wherein the position identifier is an identifier of a seat arranged in a space as a subject for estimation by the position estimation system.

15. The position estimation system according to claim 8, comprising:

a first computer including a first processor and a first storage device; and a second computer including a second processor and a second storage device, wherein the first storage device is configured to store the data associating the measurement data obtained by the first terminal device with the position identifier, the first processor is configured to:

specify the period from when the first terminal device acquires the position identifier until when the processor determines that the user of the first terminal device has moved based on the acceleration or the number of steps; and use the first training data to create the position estimation model configured to output the position identifier as the position estimation result when the position estimation model receives the measurement data, the second storage device is configured to store the position estimation model, and the second processor is configured to, when the second processor receivers the measurement data obtained by the first terminal device, estimate the position of the first terminal device by using the received measurement data and the position estimation model.

16. A position estimation system comprising:

a processor; and a storage device, wherein the storage device is configured to store data associating measurement data obtained by a first terminal device with a position identifier, the measurement data includes data on at least one of a radio wave, a geomagnetism, a direction or an atmospheric pressure which are measured, the measurement data further includes data on at least one of a measured acceleration or a number of steps calculated based on the acceleration, and the processor is configured to:

specify a period from when the first terminal device acquires the position identifier until when the processor determines that a user of the first terminal device has moved based on the acceleration or the number of steps;

use first training data including the measurement data obtained by the first terminal device during the specified period and the position identifier corresponding to the measurement data obtained by the first terminal device to create a position estimation model configured to output the position identifier as a position estimation result when the position estimation model receives the measurement data; and when the processor receives the measurement data obtained by the first terminal device, estimate a position of the first terminal device by using the received measurement data and the position estimation model;

wherein:

the position estimation model created by using the first training data is a position estimation model corresponding to an identifier of the first terminal device configured to output one of position identifiers having a stay record by the user of the first terminal device as a position estimation result of the first terminal device when the position estimation model receives the measurement data obtained by the first terminal device, and the processor is configured to:

use other training data including measurement data obtained by other terminal devices and position identifiers corresponding to the measurement data obtained by the other terminal devices to create, as a general-purpose position estimation model, a position estimation model configured to output one of all the position identifiers in a space as a subject for estimation by the position estimation system as a position estimation result when the position estimation model receives the measurement data;

when the processor receives the measurement data obtained by the first terminal device, acquire a position identifier and a likelihood as a first estimation result of the position of the first terminal device by using the received measurement data and the position estimation model corresponding to the identifier of the first terminal device;

further acquire a position identifier and a likelihood as a second estimation result of the position of the first terminal device by using the received measurement data and the general-purpose position estimation model; and output one of the position identifiers having a higher likelihood among the first estimation result and the second estimation result as a final estimation result of the position of the first terminal device.

17. The position estimation system according to claim 16, wherein the space as the subject for the position estimation by the position estimation system is divided into a plurality of areas, the storage device is further configured to store information associating position identifiers with identifiers of the areas to which positions belong, and the processor is configured to:

create, as an area estimation model, a position estimation model configured to output one of the identifiers of the areas as an estimation result when the position estimation model receives the measurement data;

create, as a position estimation model corresponding to the identifier of each area, a position estimation model for the area configured to output one of the position identifiers in the area as an estimation result when the position estimation model receives the measurement data;

when the processor receives the measurement data obtained by the first terminal device, estimate the area to which the position of the first terminal device belongs by using the received measurement data and the area estimation model; and estimate the position of the first terminal device in the area by using the measurement data and the position estimation model corresponding to the identifier of the area acquired as the estimation result of the area.

18. The position estimation system according to claim 17, wherein the space as the subject for the position estimation by the position estimation system is divided into the plurality of areas such that a part of at least one of the areas overlaps with a part of an area adjacent to the area.

19. The position estimation system according to claim 16, wherein the position identifier is an identifier of a seat arranged in a space as a subject for estimation by the position estimation system.

20. The position estimation system according to claim 16, comprising:

a first computer including a first processor and a first storage device; and a second computer including a second processor and a second storage device, wherein the first storage device is configured to store the data associating the measurement data obtained by the first terminal device with the position identifier, the first processor is configured to:

specify the period from when the first terminal device acquires the position identifier until when the processor determines that the user of the first terminal device has moved based on the acceleration or the number of steps; and use the first training data to create the position estimation model configured to output the position identifier as the position estimation result when the position estimation model receives the measurement data, the second storage device is configured to store the position estimation model, and the second processor is configured to, when the second processor receivers the measurement data obtained by the first terminal device, estimate the position of the first terminal device by using the received measurement data and the position estimation model.

* * * * *